US010735736B2

(12) United States Patent
He

(10) Patent No.: US 10,735,736 B2
(45) Date of Patent: Aug. 4, 2020

(54) SELECTIVE MIXING FOR ENTROPY CODING IN VIDEO COMPRESSION

(71) Applicant: GOOGLE LLC, Mountain View, CA (US)

(72) Inventor: Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 15/707,278

(22) Filed: Sep. 18, 2017

(65) Prior Publication Data

US 2019/0068970 A1 Feb. 28, 2019

Related U.S. Application Data

(60) Provisional application No. 62/551,341, filed on Aug. 29, 2017.

(51) Int. Cl.
*H04N 19/13* (2014.01)
*H04N 19/18* (2014.01)
(Continued)

(52) U.S. Cl.
CPC ........... *H04N 19/13* (2014.11); *H04N 19/124* (2014.11); *H04N 19/159* (2014.11);
(Continued)

(58) Field of Classification Search
CPC ............................. H04N 19/124; H04N 19/13
See application file for complete search history.

(56) References Cited

U.S. PATENT DOCUMENTS

2007/0016418 A1  1/2007  Mehrotra et al.
2007/0233477 A1  10/2007  Halowani et al.
(Continued)

FOREIGN PATENT DOCUMENTS

EP  2945383 A1  11/2015
EP  3182705 A2  6/2017

OTHER PUBLICATIONS

International Search Report and Written Opinion in PCT/US2018/030357, dated Jul. 9, 2018, 15 pgs.
(Continued)

*Primary Examiner* — William C Vaughn, Jr.
*Assistant Examiner* — Jerry T Jean Baptiste
(74) *Attorney, Agent, or Firm* — Young Basile Hanlon & MacFarlane, P.C.

(57) ABSTRACT

An apparatus for decoding transform coefficients using an alphabet of transform coefficient tokens includes a memory and a processor. The processor is configured to execute instructions stored in the memory to select a first probability distribution corresponding to a first context, select a second probability distribution corresponding to a second context, and, in response to determining that the second probability distribution includes a probability for a transform coefficient token, mix the first probability distribution and the second probability distribution to generate a mixed probability and entropy decode, from an encoded bitstream, the transform coefficient token using the mixed probability. The first probability distribution is defined for all tokens of the alphabet. The second probability distribution is defined over a non-trivial partition of the tokens.

17 Claims, 14 Drawing Sheets

(51) Int. Cl.
   *H04N 19/159*   (2014.01)
   *H04N 19/196*   (2014.01)
   *H04N 19/124*   (2014.01)
   *H04N 19/176*   (2014.01)
   *H04N 19/91*    (2014.01)
   *H04N 19/96*    (2014.01)
   *H04N 19/129*   (2014.01)

(52) U.S. Cl.
   CPC ........... *H04N 19/176* (2014.11); *H04N 19/18* (2014.11); *H04N 19/196* (2014.11); *H04N 19/91* (2014.11); *H04N 19/96* (2014.11); *H04N 19/129* (2014.11)

(56) References Cited

U.S. PATENT DOCUMENTS

| | | | |
|---|---|---|---|
| 2011/0200104 A1 | 8/2011 | Korodi et al. | |
| 2012/0106628 A1* | 5/2012 | Sole ........................ | H04N 19/91 375/240.02 |
| 2012/0170857 A1 | 7/2012 | He et al. | |
| 2013/0121410 A1* | 5/2013 | Chang ..................... | H04N 19/91 375/240.12 |
| 2013/0132064 A1* | 5/2013 | Hwang ................... | G06F 40/53 704/2 |
| 2013/0173258 A1* | 7/2013 | Liu ........................ | G06F 40/126 704/9 |
| 2015/0110409 A1* | 4/2015 | Bultje ................... | H04N 19/129 382/239 |
| 2015/0334387 A1* | 11/2015 | Wang ..................... | H04N 19/91 375/240.02 |

OTHER PUBLICATIONS

Jing Wang et al., "Transform Coefficient Coding Design for AVS2 Video Coding Standard", 2013 Visual Communications and Image Processing (VCIP), IEEE, Nov. 17, 2013), 6 pgs.

Combined Search and Examination Report in corresponding foreign Application No. GB1621882.8, dated May 26, 2017.

Sadakane et al., "Implementing the Context Tree Weighting Method for Text Compression"; Department of Information Science, University of Tokyo; Mar. 28, 2000; pp. 1-10.

Willems, et al., "The Context-Tree Weighting Method: Basic Properties", IEEE Transactions on Information Theory, vol. 41, No. 3, May, 1995; pp. 653-664.

International Search Report and Written Opinion in PCT/US2018/030355, dated Jul. 9, 2018, 13 pgs.

Willems, F.M.J. et al.; "The Context-tree Weighting Method: Basic Properties"; IEEE Transactions on Information Theory; vol. 41, Issue: 3, May, 1995; pp. 653-664.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

\* cited by examiner

SELECTIVE MIXING FOR ENTROPY CODING IN VIDEO COMPRESSION

CROSS-REFERENCE TO RELATED APPLICATION(S)

This application claims priority to and the benefit of U.S. Provisional Patent Application Ser. No. 62/551,341, filed Aug. 29, 2017, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

An aspect is an apparatus for decoding transform coefficients using an alphabet of transform coefficient tokens including a memory and a processor. The processor is configured to execute instructions stored in the memory to select a first probability distribution corresponding to a first context, select a second probability distribution corresponding to a second context, and, in response to determining that the second probability distribution includes a probability for a transform coefficient token, mix the first probability distribution and the second probability distribution to generate a mixed probability and entropy decode, from an encoded bitstream, the transform coefficient token using the mixed probability. The first probability distribution is defined for all tokens of the alphabet. The second probability distribution is defined over a non-trivial partition of the tokens.

Another aspect is a method for coding transform coefficients using an alphabet of tokens. The method includes selecting a first probability distribution corresponding to a first context and that is defined for some tokens of the alphabet, selecting a second probability distribution corresponding to a second context and that is defined over a non-trivial partition of the tokens, and, in response to determining that the first probability distribution includes a probability for a token and the second probability distribution includes a second probability for the token, mixing the first probability distribution and the second probability distribution to generate a mixed probability and coding the token using the mixed probability.

Another aspect is an apparatus for decoding transform coefficients using an alphabet of tokens organized in a coefficient token tree including a memory and a processor. The processor is configured to execute instructions stored in the memory to select a first probability distribution corresponding to a first context and defined for internal nodes of the coefficient token tree, select a second probability distribution corresponding to a second context and defined for some, but not all, internal nodes of the coefficient token tree, and decode a token by decoding a first decision related to a first internal node of the coefficient token tree using a mixed probability. The mixed probability is generated by mixing the first probability distribution and the second probability distribution.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings wherein like reference numerals refer to like parts throughout the several views.

DETAILED DESCRIPTION

Figure 1:
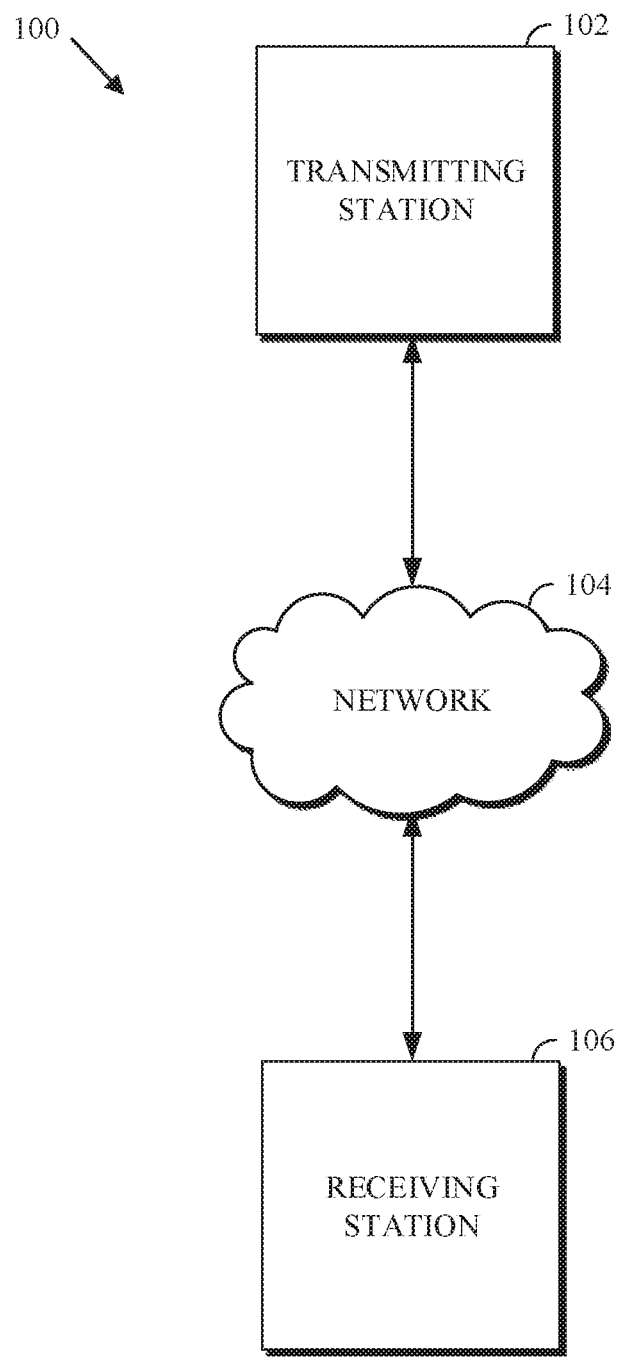
FIG. 1 is a schematic of a video encoding and decoding system.

As mentioned above, compression schemes related to coding video streams may include breaking images into blocks and generating a digital video output bitstream using one or more techniques to limit the information included in the output. A received encoded bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

As further described below, the residual block can be in the pixel domain. The residual block can be transformed into the frequency domain resulting in a transform block of transform coefficients. The transform coefficients can be quantized resulting into a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients). Encoders may use techniques to decrease the amount of bits spent on coefficient coding. For example, a coefficient token tree (which may also be referred to as a binary token tree) specifies the scope of the value, with forward-adaptive probabilities for each branch in this token tree. The token base value is subtracted from the value to be coded to form a residual then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream in order to decode the video bitstream.

As described above, entropy coding a sequence of symbols is typically achieved by using a probability model to determine a probability p for the sequence and then using binary arithmetic coding to map the sequence to a binary codeword at the encoder and to decode that sequence from the binary codeword at the decoder. The length (i.e., number of bits) of the codeword is given by $-\log(p)$. The efficiency of entropy coding can be directly related to the probability model. Throughout this document, log denotes the logarithm function to base 2 unless specified otherwise.

A model, as used herein, can be, or can be a parameter in, a lossless (entropy) coding. A model can be any parameter or method that affects probability estimation for entropy coding. For example, a model can define the probability to be used to encode and decode the decision at an internal node in a token tree (such as described with respect to FIG. 7 below). In such a case, the two-pass process to learn the probabilities for a current frame may be simplified to a single-pass process by mixing multiple models as described herein. In another example, a model may define a certain context derivation method. In such a case, implementations according to this disclosure can be used to automatically mix coding probabilities generated by a multitude of such methods. In yet another example, a model may define a completely new lossless coding algorithm.

A purpose of context modeling is to obtain probability distributions for a subsequent entropy coding engine, such as arithmetic coding, Huffman coding, and other variable-length-to-variable-length coding engines. To achieve good compression performance, a large number of contexts may be required. For example, some video coding systems can include hundreds or even thousands of contexts for transform coefficient coding alone. Each context can correspond to a probability distribution.

A probability distribution can be learnt by a decoder and/or included in the header of a frame to be decoded.

Learnt can mean that an entropy coding engine of a decoder can adapt the probability distributions (i.e., probability models) of a context model based on decoded frames. For example, the decoder can have available an initial probability distribution that the decoder (e.g., the entropy coding engine of the decoder) can continuously update as the decoder decodes additional frames. The updating of the probability models can insure that the initial probability distribution is updated to reflect the actual distributions in the decoded frames.

Including a probability distribution in the header can instruct the decoder to use the included probability distribution for decoding the next frame, given the corresponding context. A cost (in bits) is associated with including each probability distribution in the header. For example, in a coding system that includes 3000 contexts and that encodes a probability distribution (coded as an integer value between 1 and 255) using 8 bits, 24,000 bits are added to the encoded bitstream. These bits are overhead bits. Some techniques can be used to reduce the number of overhead bits. For example, the probability distributions for some, but not all, of the contexts can be included. For example, prediction schemes can also be used to reduce the overhead bits. Even with these overhead reduction techniques, the overhead is non-zero.

A key design challenge or problem in context modeling is to balance between two conflicting objectives, which are further described below, namely: 1) improving compression performance by adding more contexts and 2) reducing the overhead cost associated with contexts. The problem is particularly relevant in cases where multi-symbol, non-binary alphabets are involved due, in part, to the fact that the overhead associated with a context grows as the alphabet size grows.

Implementations according to this disclosure use selective mixing so that contexts can be added while limiting the overhead associated with the added contexts. A context can define a probability distribution over, for example, the alphabet of tokens used to encode transform coefficients. In selective mixing, a first context model can be used to determine a first probability distribution defined for all tokens and a second context can be used to determine a second probability distribution for more frequent tokens. The number of the more frequent tokens is less than the number of all tokens. In coding a coefficient, the selective mixing mixes the first and the second probability distributions for the more frequent tokens and uses the first probability distribution for the remaining tokens.

Implementations according to this disclosure can use selective mixing of probability models. Mixing models can be used for encoding any value that is encoded using entropy coding. For example, two or more probability models can be mixed in order to entropy code quantized transform coefficients. The benefits of implementations according to this disclosure include reduced overhead associated with contexts and improved compression performance. Additionally, using selective mixing, context modeling in a coding system can be designed such that some contexts can be derived from contextual information that affects the overall distribution over an alphabet E while other contexts can be derived from contextual information that affects only a portion of the distribution over the alphabet E thereby reducing the overhead associated with contexts as compared to coding systems that do not use selective mixing.

Mixing for entropy coding in video compression is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
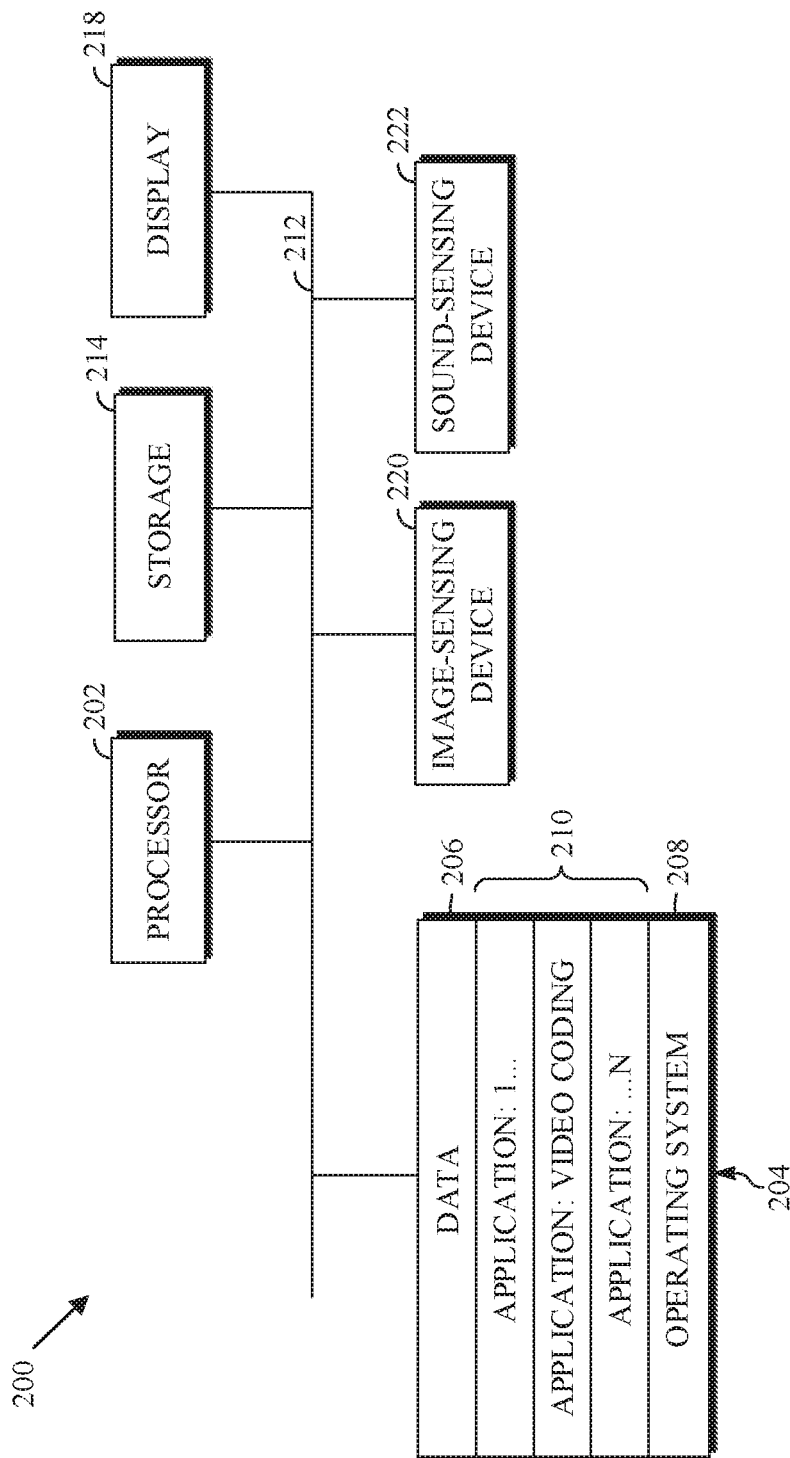
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission, at a later time, to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
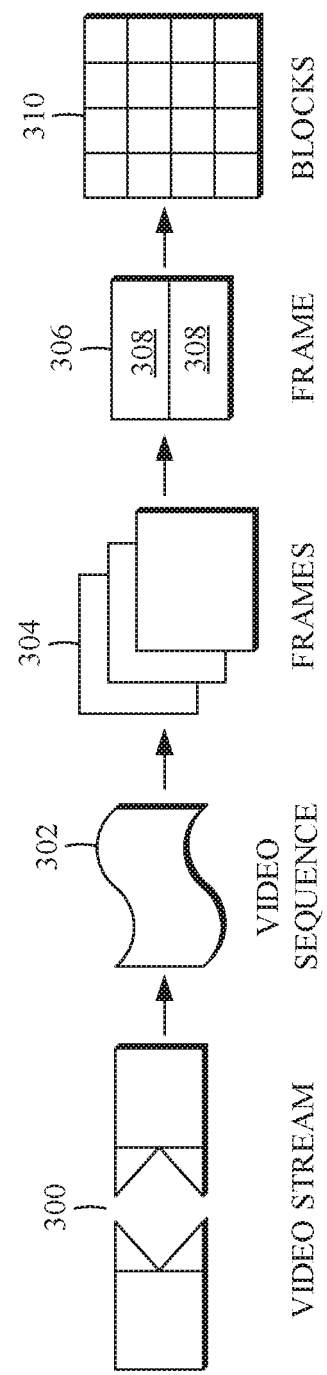
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
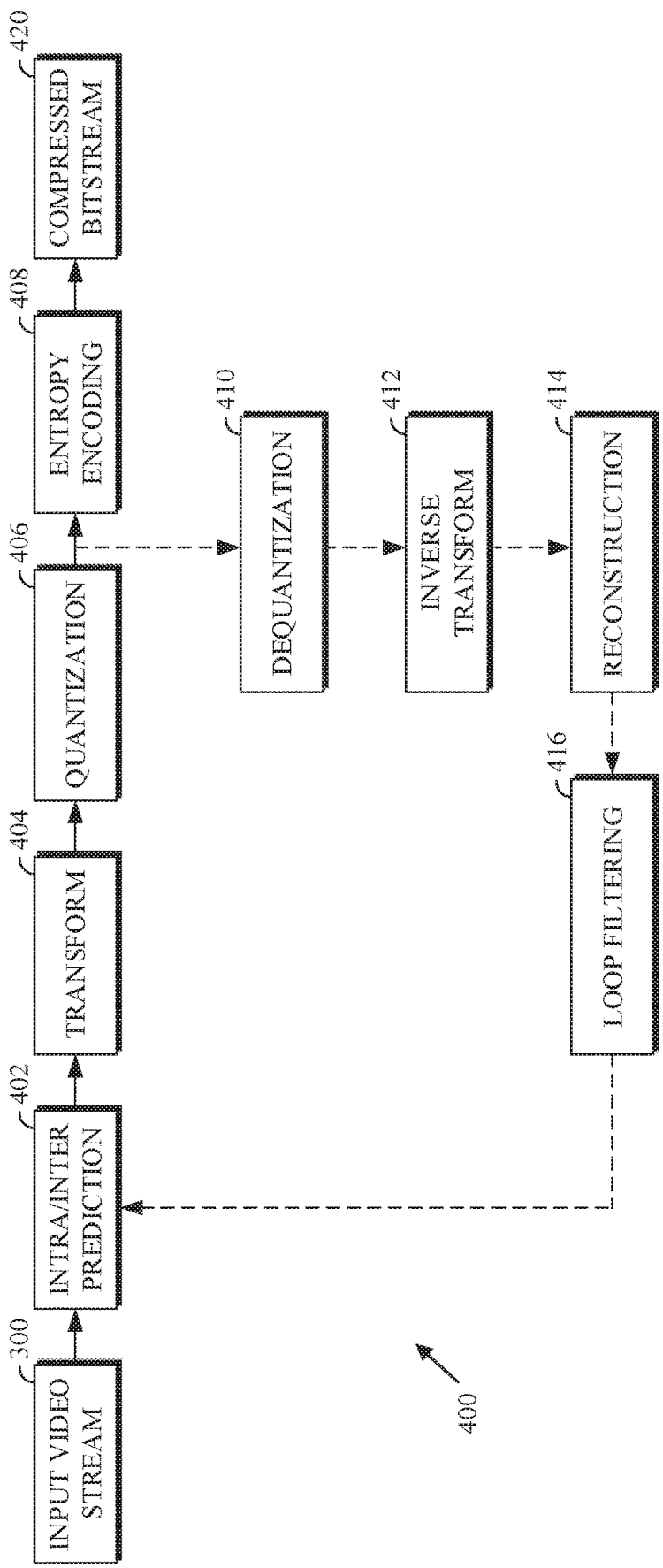
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
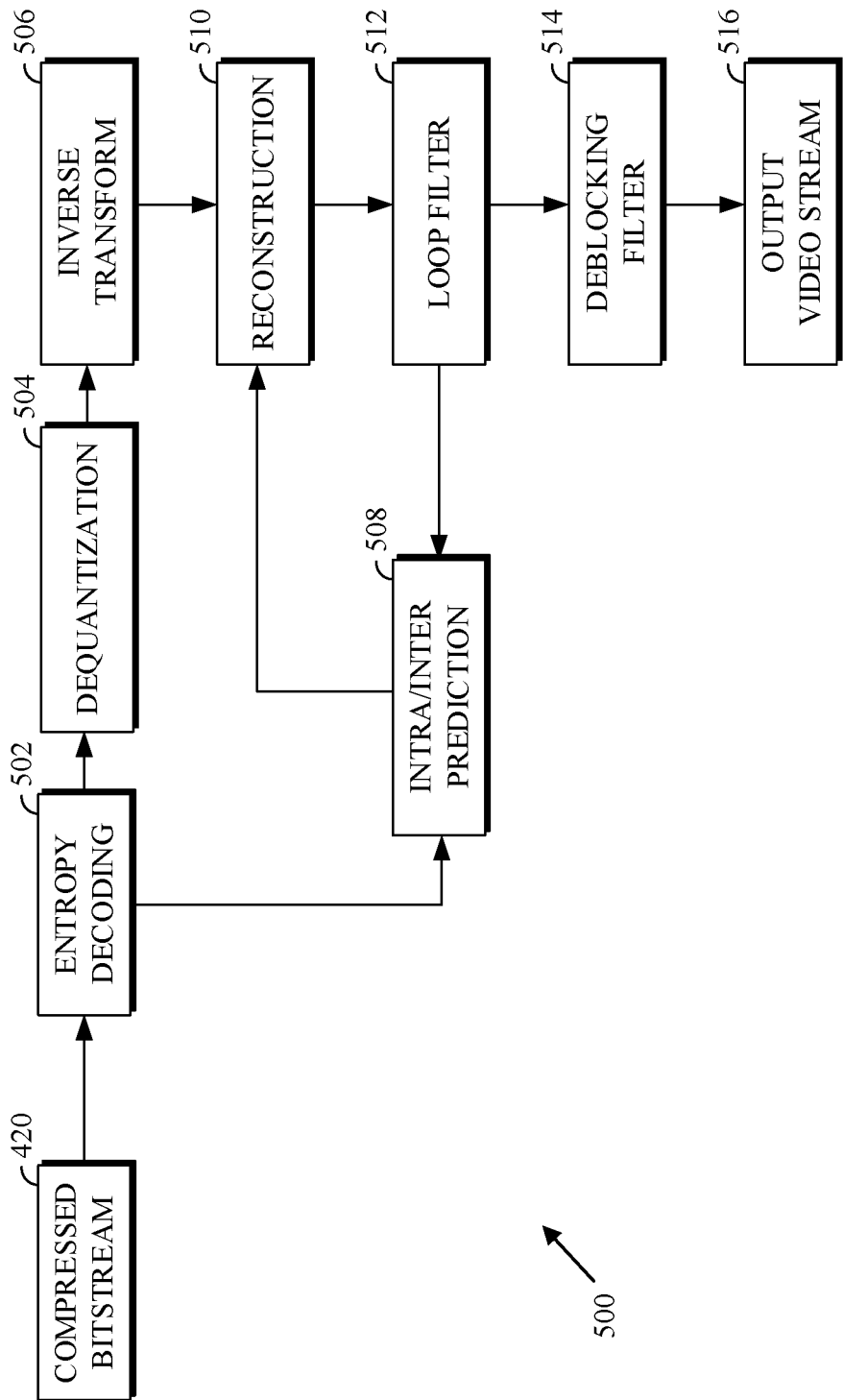
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIGS. 8 and 9 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
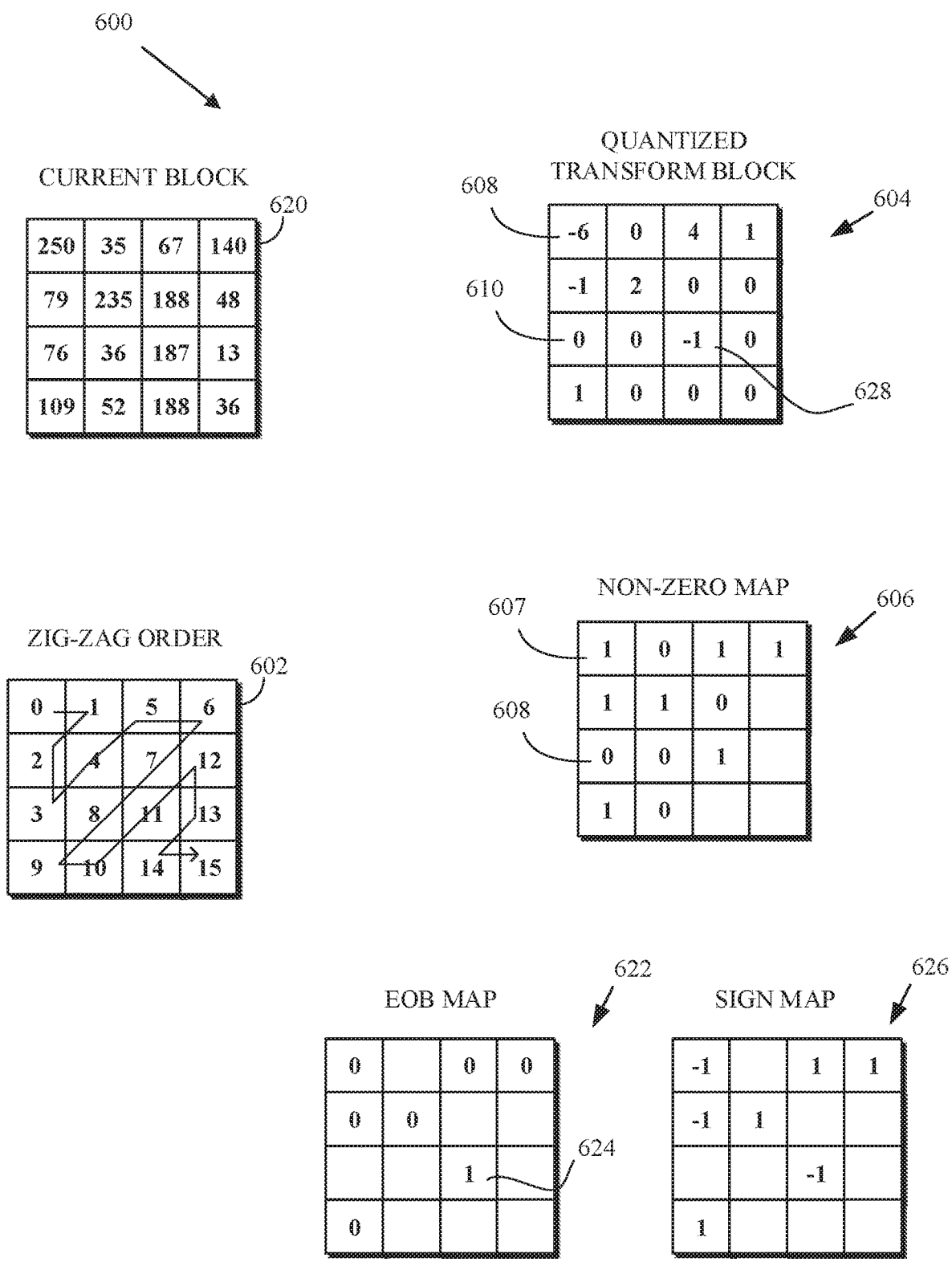
FIG. 6 is a diagram illustrating quantized transform coefficients according to implementations of this disclosure.

FIG. 6 is a diagram 600 illustrating quantized transform coefficients according to implementations of this disclosure. The diagram 600 depicts a current block 620, a scan order 602, a quantized transform block 604, a non-zero map 606, an end-of-block map 622, and a sign map 626. The current block 620 is illustrated as a 4×4 block. However, any block size is possible. For example, the current block can have a size (i.e., dimensions) of 4×4, 8×8, 16×16, 32×32, or any other square or rectangular block size. The current block 620 can be a block of a current frame. In another example, the current frame may be partitioned into segments (such as the segments 308 of FIG. 3), tiles, or the like, each including a collection of blocks, where the current block is a block of the partition.

The quantized transform block 604 can be a block of size similar to the size of the current block 620. The quantized transform block 604 includes non-zero coefficients (e.g., a coefficient 608) and zero coefficients (e.g., a coefficient 610). As described above, the quantized transform block 604 contains quantized transform coefficients for the residual block corresponding to the current block 620. Also as described above, the quantized transform coefficients are entropy coded by an entropy-coding phase, such as the entropy coding stage 408 of FIG. 4.

Entropy coding a quantized transform coefficient can involve the selection of a context model (also referred to as probability context model, probability model, model, and context) which provides estimates of conditional probabilities for coding the binary symbols of a binarized transform coefficient as described below with respect to FIG. 7. When entropy coding a quantized transform coefficient, additional information may be used as the context for selecting a context model. For example, the magnitudes of the previously coded transform coefficients can be used, at least partially, for determining a probability model.

To encode a transform block, a video coding system may traverse the transform block in a scan order and encode (e.g., entropy encode) the quantized transform coefficients as the quantized transform coefficients are respectively traversed (i.e., visited). In a zig-zag scan order, such as the scan order 602, the top left corner of the transform block (also known as the DC coefficient) is first traversed and encoded, the next coefficient in the scan order (i.e., the transform coefficient corresponding to the location labeled "1") is traversed and encoded, and so on. In the zig-zag scan order (i.e., scan order 602), some quantized transform coefficients above and to the left of a current quantized transform coefficient (e.g., a to-be-encoded transform coefficient) are traversed first. Other scan orders are possible. A one-dimensional structure (e.g., an array) of quantized transform coefficients can result from the traversal of the two-dimensional quantized transform block using the scan order.

In some examples, encoding the quantized transform block 604 can include determining the non-zero map 606, which indicates which quantized transform coefficients of the quantized transform block 604 are zero and which are non-zero. A non-zero coefficient and a zero coefficient can be indicated with values one (1) and zero (0), respectively, in the non-zero map. For example, the non-zero map 606 includes a non-zero 607 at Cartesian location (0, 0) corresponding to the coefficient 608 and a zero 608 at Cartesian location (2, 0) corresponding to the coefficient 610.

In some examples, encoding the quantized transform block 604 can include generating and encoding the end-of-block map 622. The end-of-block map indicates whether a non-zero quantized transform coefficient of the quantized transform block 604 is the last non-zero coefficient with respect to a given scan order. If a non-zero coefficient is not the last non-zero coefficient in the transform block, then it can be indicated with the binary bit 0 (zero) in the end-of-block map. If, on the other hand, a non-zero coefficient is the last non-zero coefficient in the transform block, then it can be indicated with the binary value 1 (one) in the end-of-block map. For example, as the quantized transform coefficient corresponding to the scan location 11 (i.e., the last non-zero quantized transform coefficient 628) is the last non-zero coefficient of the quantized transform block 604, it is indicated with the end-of-block value 624 of 1 (one); all other non-zero transform coefficients are indicated with a zero.

In some examples, encoding the quantized transform block 604 can include generating and encoding the sign map 626. The sign map 626 indicates which non-zero quantized transform coefficients of the quantized transform block 604 have positive values and which quantized transform coefficients have negative values. Transform coefficients that are zero need not be indicated in the sign map. The sign map 626 illustrates the sign map for the quantized transform block 604. In the sign map, negative quantized transform coefficients can be indicated with a −1 and positive quantized transform coefficients can be indicated with a 1.

Figure 7:
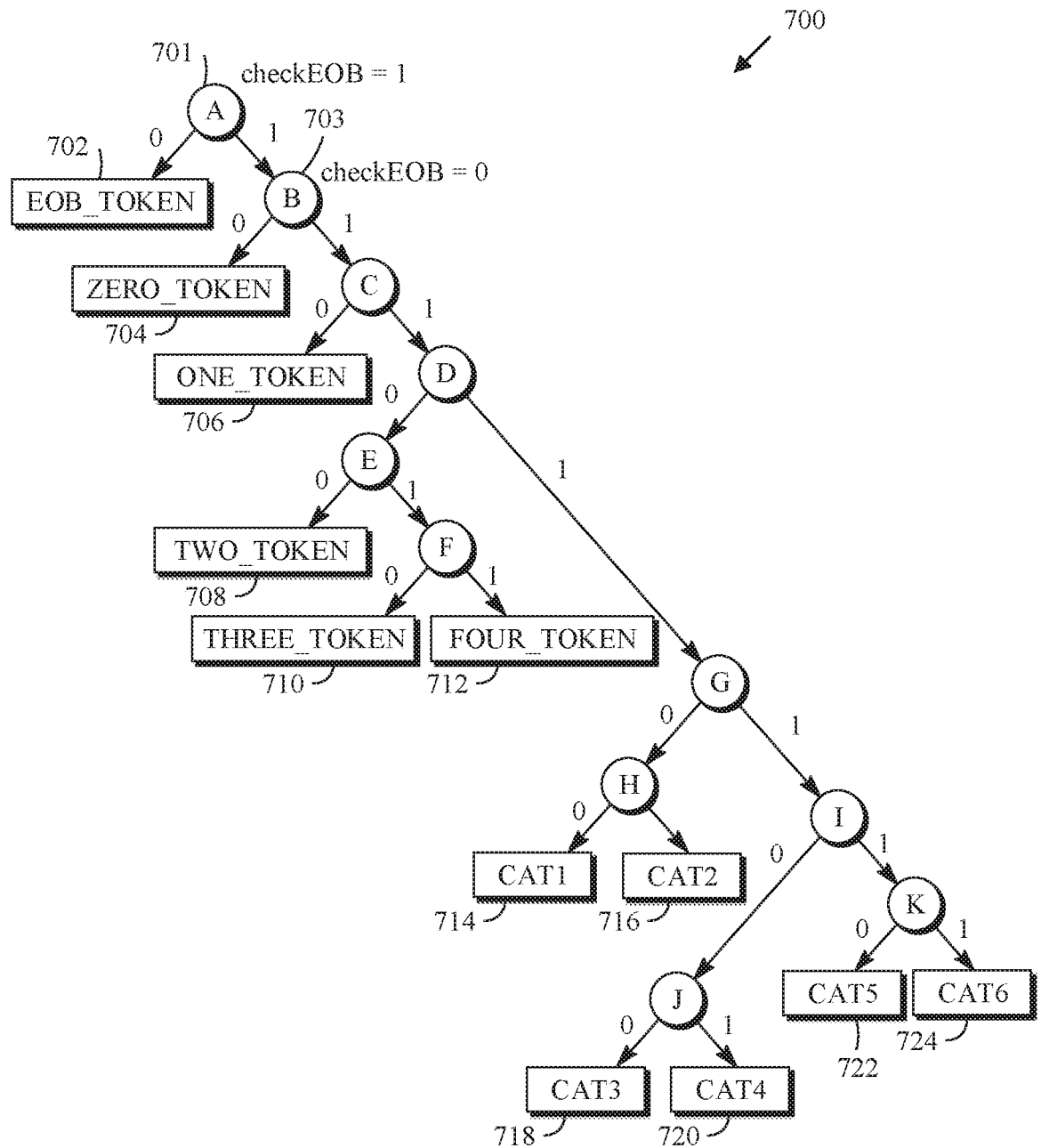
FIG. 7 is a diagram of a coefficient token tree that can be used to entropy code blocks into a video bitstream according to implementations of this disclosure.

FIG. 7 is a diagram of a coefficient token tree 700 that can be used to entropy code blocks into a video bitstream according to implementations of this disclosure. The coefficient token tree 700 is referred to as a binary tree because, at each node of the tree, one of two branches must be taken (i.e., traversed). The coefficient token tree 700 includes a root node 701 and a node 703 corresponding, respectively, to the nodes labeled A and B.

As described above with respect to FIG. 6, when an end-of-block (EOB) token is detected for a block, coding of coefficients in the current block can terminate and the remaining coefficients in the block can be inferred to be zero. As such, the coding of EOB positions can be an essential part of coefficient in a video coding system.

In some video coding systems, a binary decision determining whether (or not) a current token is equal to the EOB token of the current block is coded immediately after an nonzero coefficient is decoded or at the first scan position (DC). In an example, for a transform block of size M×N, where M denotes the number of columns and N denotes the number of rows in the transform block, the maximum number of times of coding whether a current token is equal to the EOB token is equal to M×N. M and N can take values, such as the values 2, 4, 8, 16, 32, and 64. As described below, the binary decision corresponds to the coding of a "1" bit corresponding to the decision to move from the root node 701 to the node 703 in the coefficient token tree 700. Herein, "coding a bit" can mean the outputting or generating of a bit in the codeword representing a transform coefficient being encoded. Similarly, "decoding a bit" can mean the reading (such as from an encoded bitstream) of a bit of the codeword corresponding to a quantized transform coefficient being decoded such that the bit corresponds to a branch being traversed in the coefficient token tree.

Using the coefficient token tree 700, a string of binary digits is generated for a quantized coefficient (e.g., the coefficients 608, 610 of FIG. 6) of the quantized transform block (such as the quantized transform block 604 of FIG. 6).

In an example, the quantized coefficients in an N×N block (e.g., quantized transform block 604) are organized into a 1D (one-dimensional) array (herein, an array u) following a prescribed scan order (e.g., the scan order 602 of FIG. 6). N can be 4, 8, 16, 32, or any other value. The quantized coefficient at the $i^{th}$ position of the 1D array can be referred as u[i], where i=0, . . . , N*N−1. The starting position of the last run of zeroes in u[i], . . . , u[N*N−1] can be denoted as eob. In the case where when u[N*N−1] is not zero, the eob can be set to the value N*N. That is, if the last coefficient of the 1D array u is not zero, then eob can be set to the value N*N. Using the examples of FIG. 6, the 1D array u can have the entries u[ ]=[−6, 0, −1, 0, 2, 4, 1, 0, 0, 1, 0, −1, 0, 0, 0, 0]. The values at each of the u[i]s is a quantized transform coefficient. The quantized transform coefficients of the 1D array u may also be referred herein simply as "coefficients" or "transform coefficients." The coefficient at position i=0 (i.e., u[0]=−6) corresponds to the DC coefficient. In this example, the eob is equal to 12 because there are no non-zero coefficients after the zero coefficient at position 12 of the 1D array u.

To encode and decode the coefficients u[i], . . . , u[N*N−1], for i=0 to N*N−1, a token t[i] is generated at each position i<=eob. The token t[i], for i<eob, can be indicative of the size and/or size range of the corresponding quantized transform coefficient at u[i]. The token for the quantized transform coefficient at eob can be an EOB_TOKEN, which is a token that indicates that the 1D array u contains no non-zero coefficients following the eob position (inclusive). That is, t[eob]=EOB_TOKEN indicates the EOB position of the current block. Table I provides a listing of an example of token values, excluding the EOB_TOKEN, and their corresponding names according to an implementation of this disclosure.

TABLE I

| Token | Name of Token |
| --- | --- |
| 0 | ZERO_TOKEN |
| 1 | ONE_TOKEN |
| 2 | TWO_TOKEN |
| 3 | THREE_TOKEN |
| 4 | FOUR_TOKEN |
| 5 | DCT_VAL_CAT1 (5, 6) |
| 6 | DCT_VAL_CAT2 (7-10) |
| 7 | DCT_VAL_CAT3 (11-18) |
| 8 | DCT_VAL_CAT4 (19-34) |
| 9 | DCT_VAL_CAT5 (35-66) |
| 10 | DCT_VAL_CAT6 (67-2048) |

In an example, quantized coefficient values are taken to be signed 12-bit integers. To represent a quantized coefficient value, the range of 12-bit signed values can be divided into 11 tokens (the tokens 0-10 in Table I) plus the end of block token (EOB_TOKEN). To generate a token to represent a quantized coefficient value, the coefficient token tree 700 can be traversed. The result (i.e., the bit string) of traversing the tree can then be encoded into a bitstream (such as the bitstream 420 of FIG. 4) by an encoder as described with respect to the entropy encoding stage 408 of FIG. 4.

The coefficient token tree 700 includes the tokens EOB_TOKEN (token 702), ZERO_TOKEN (token 704), ONE_TOKEN (token 706), TWO_TOKEN (token 708), THREE_TOKEN (token 710), FOUR_TOKEN (token 712), CAT1 (token 714 that is DCT_VAL_CAT1 in Table I), CAT2 (token 716 that is DCT_VAL_CAT2 in Table I), CAT3 (token 718 that is DCT_VAL_CAT3 in Table I), CAT4 (token 720 that is DCT_VAL_CAT4 in Table I), CAT5 (token 722 that is DCT_VAL_CAT5 in Table I) and CAT6 (token 724 that is DCT_VAL_CAT6 in Table I). As can be seen, the coefficient token tree maps a single quantized coefficient value into a single token, such as one of the tokens 704, 706, 708, 710 and 712. Other tokens, such as the tokens 714, 716, 718, 720, 722 and 724, represent ranges of quantized coefficient values. For example, a quantized transform coefficient with a value of 37 can be represented by the token DCT_VAL_CAT5 the token 722 in FIG. 7.

The base value for a token is defined as the smallest number in its range. For example, the base value for the token 720 is 19. Entropy coding identifies a token for each quantized coefficient and, if the token represents a range, can form a residual by subtracting the base value from the quantized coefficient. For example, a quantized transform coefficient with a value of 20 can be represented by including the token 720 and a residual value of 1 (i.e., 20 minus 19) in the encoded video bitstream to permit a decoder to reconstruct the original quantized transform coefficient. The end of block token (i.e., the token 702) signals that no further non-zero quantized coefficients remain in the transformed block data.

In another example of token values for coefficient coding, Table 1 is split up into two, where the first (head) set includes ZERO_TOKEN, ONE_NOEOB, ONE_EOB, TWO_NOEOB, and TWO_EOB; and the second (tail) set includes TWO_TOKEN, THREE_TOKEN, FOUR_TOKEN, DCT_VAL_CAT1, DCT_VAL_CAT2, DCT_VAL_CAT3, DCT_VAL_CAT4, DCT_VAL_CAT5 and DCT_VAL_CAT6. The second (tail) set is used only if a TWO_EOB or TWO_NOEOB in the first (head) set is encoded or decoded. The tokens ONE_NOEOB and TWO_NOEOB correspond, respectively to the ONE_TOKEN and the TWO_TOKEN when traversal of the coefficient token tree 700 starts at the node 703 (i.e., when checkEob=0). The tokens ONE_EOB and TWO_EOB can be or can correspond to, respectively, the ONE_TOKEN and the TWO_TOKEN (i.e., traversal of coefficient token tree 700 starting at the root node 701). Tree traversal of coefficient token tree 700 and checkEob are further described below.

To encode or decode a token t[i] by using a binary arithmetic coding engine (such as by the entropy encoding stage 408 of FIG. 4), the coefficient token tree 700 can be used. The coefficient token tree 700 is traversed starting at the root node 701 (i.e., the node labeled A). Traversing the coefficient token tree generates a bit string (a codeword) that will be encoded into the bitstream using, for example, binary arithmetic coding. The bit string is a representation of the current coefficient (i.e., the quantized transform coefficient being encoded).

If a current coefficient is zero, and there are no more non-zero values for the remaining transform coefficients, the token 702 (i.e., the EOB_TOKEN) is added into the bitstream. This is the case, for example, for the transform coefficient at scan order location 12 of FIG. 6. On the other hand, if the current coefficient is non-zero, or if there are non-zero values among any remaining coefficients of the current block, a "1" bit is added to the codeword and traversal passes to the node 703 (i.e., the node labeled B). At node B, the current coefficient is tested to see if it is equal to zero. If so, the left-hand branch is taken such that token 704 representing the value ZERO_TOKEN and a bit "0" is added to the codeword. If not, a bit "1" is added to the codeword and traversal passes to node C. At node C, the current coefficient is tested to see if it is greater than 1. If the current coefficient is equal to 1, the left-hand branch is taken and token 706 representing the value ONE_TOKEN is added to the bitstream (i.e., a "0" bit is added to the codeword). If the current coefficient is greater than 1, traversal passes to node D to check the value of the current coefficient as compared to the value 4. If the current coefficient is less than or equal to 4, traversal passes to node E and a "0" bit is added to the codeword. At node E, a test for equality to the value "2" may be made. If true, token 706 representing the value "2" is added to the bitstream (i.e., a bit "0" is added to the codeword). Otherwise, at node F, the current coefficient is tested against either the value "3" or the value "4" and either token 710 (i.e., bit "0" is added to the codeword) or token 712 (i.e., bit "1" is added to the codeword) to the bitstream as appropriate; and so on.

Essentially, a "0" bit is added to the codeword upon traversal to a left child node and a "1" bit is added to the codeword upon traversal to a right child node. A similar process is undertaken by a decoder when decoding a codeword from a compressed bitstream. The decoder reads a bit from bit stream. If the bit is a "1," the coefficient token tree is traversed to the right and if the bit is a "0," the tree is traversed to the left. The decoder reads then a next bit and repeats the process until traversal of the tree reaches a leaf node (i.e., a token). As an example, to encode a token t[i]=THREE_TOKEN, starting from the root node (i.e., the root node 701), a binary string of 111010 is encoded. As another example, decoding the codeword 11100 results in the token TWO_TOKEN.

Note that the correspondence between "0" and "1" bits to left and right child nodes is merely a convention used to describe the encoding and decoding processes. In some implementations, a different convention, for example, in one where "1" corresponds to the left child node, and "0" corresponds to the right child node, can be used. As long as both the encoder and the decoder adopt the same convention, the processes described herein apply.

Since an EOB_TOKEN is only possible after a nonzero coefficient, when u[i−1] is zero (that is, when the quantized transform coefficient at location i−1 of the 1D array u is equal to zero), a decoder can infer that the first bit must be 1. The first bit has to be 1 since, in traversing the tree, for a transform coefficient (e.g., transform coefficient at the zig-zag scan order location 2 of FIG. 6) following a zero transform coefficient (e.g., transform coefficient at the zig-zag scan order location 1 of FIG. 6), the traversal necessarily moves from the root node 701 to the node 703.

As such, a binary flag checkEob can be used to instruct the encoder and the decoder to skip encoding and decoding the first bit leading from the root node in the coefficient token tree 700. In effect, when the binary flag checkEob is 0 (i.e., indicating that the root node should not be checked), the root node 701 of the coefficient token tree 700 is skipped and the node 703 becomes the first node of coefficient token tree 700 to be visited for traversal. That is, when the root node 701 is skipped, the encoder can skip encoding and the decoder can skip decoding and can infer a first bit (i.e., a binary bit "1") of the encoded string.

At the start of encoding or decoding a block, the binary flag checkEob can be initialized to 1 (i.e., indicating that the root node should be checked). The following steps illustrate an example process for decoding quantized transform coefficients in an N×N block.

At step 1, the binary flag checkEob is set to zero (i.e., checkEob=0) and an index i is also set to zero (i.e., i=0).

At step 2, a token t[i] is decoded by using either
  1) the full coefficient token tree (i.e., starting at the root node 701 of the coefficient token tree 700) if the binary flag checkEob is equal to 1 or
  2) using the partial tree (e.g., starting at the node 703) where the EOB_TOKEN is skipped, if checkEob is equal to 0.

At step 3, If the token t[i]=EOB_TOKEN, then the quantized transform coefficients u[i], . . . , u[N*N−1] are all to zero and the decoding process terminates; otherwise, extra bits can be decoded if necessary (i.e., when t[i] is not equal to the ZERO_TOKEN) and reconstruct u[i].

At step 4, the binary flag checkEob is set to 1 if u[i] is equal to zero, otherwise checkEob is set to 0. That is, checkEob can be set to the value (u[i]!=0).

At step 5, the index i is incremented (i.e., i=i+1).

At step 6, the steps 2-5 are repeated until all quantized transform coefficients have been decoded (i.e., until the index i=N*N) or until the EOB_TOKEN is decoded.

At step 2 above, decoding a token t[i] can include the steps of determining a context ctx, determining a binary probability distribution (i.e., a model) from the context ctx, and using a boolean arithmetic code to decode a path from the root node of the coefficient token tree 700 to a leaf node by using the determined probability distributions. The context ctx can be determined using a method of context derivation. The method of context derivation can use one or more of the block size, plane type (i.e., luminance or chrominance), the position i, and previously decoded tokens t[0], . . . , t[i−1] to determine the context ctx. Other criteria can be used to determine the context ctx. The binary probability distribution can be determined for any internal node of the coefficient token tree 700 starting from the root node 701 when checkEOB=1 or from the node 703 when checkEOB=0.

In some encoding systems, the probability used to encode or decode a token t[i] given a context ctx may be fixed and does not adapt in a picture (i.e., a frame). For example, the probability may be either a default value that is defined for the given context ctx or the probability may be coded (i.e., signaled) as part of the frame header for that frame. Coding the probability for every context in coding a frame can be costly. As such, an encoder may analyze, for each context, whether it is beneficial to code the context's associated probability in the frame header and signal its decision to the decoder by using a binary flag. Furthermore, coding the probability for a context may use prediction to reduce cost (e.g., in bit rate) where the prediction may be derived from the probability of the same context in a previously decoded frame.

Figure 8:
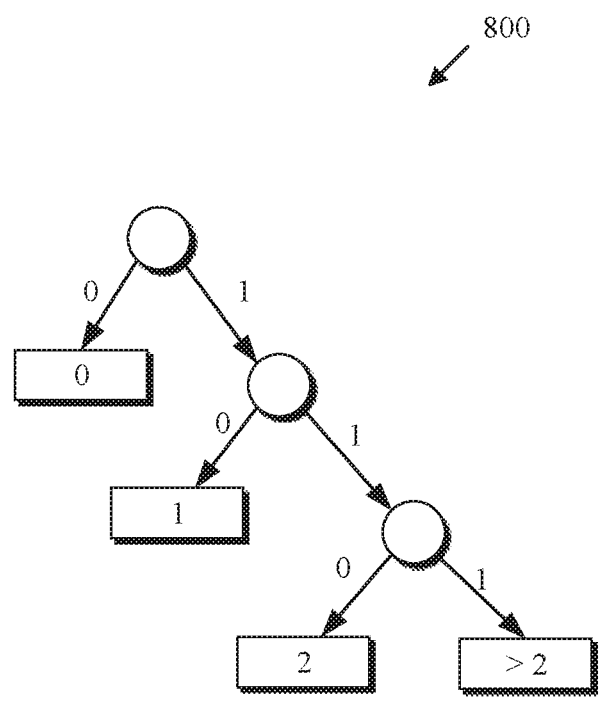
FIG. 8 is a diagram of an example of a tree for binarizing a quantized transform coefficient according to implementations of this disclosure.

FIG. 8 is a diagram of an example of a tree 800 for binarizing a quantized transform coefficient according to implementations of this disclosure. The tree 800 is a binary tree that can be used for binarizing quantized transform coefficients in some video coding systems. The tree 800 can be used by a video coding system that uses the steps of binarization, context modelling, and binary arithmetic coding for encoding and decoding of quantized transform coefficients. The process may be referred to as context-adaptive binary arithmetic coding (CABAC). For example, to code a quantized transform coefficient x, the coding system may perform the following steps. The quantized transform coefficient x can be any of the coefficients (e.g., the coefficient 608) of the quantized transform block 604 of FIG. 6.

In the binarization step, a coefficient x is first binarized into a binary string by using the tree 800. The binarization process may binarize the unsigned value of the coefficient x. For example, binarizing the coefficient 628 (i.e., the value −1), binarizes the value 1. This results in traversing the tree 800 and generating the binary string 10. Each of the bits of the binary string 10 is referred to as a bin.

In the context derivation step, for each bin to be coded, a context is derived. A context can be derived from information such as one or more of the block size, plane type (i.e., luminance or chrominance), block position of the coefficient x, and previously decoded coefficients (e.g., a left and/or above neighboring coefficients, if available). Other information can be used to derive the context.

In the binary arithmetic coding step, given a context, a bin is coded by using, e.g., a binary arithmetic coding engine into a binary codeword together with a probability value associated with the context.

The steps of coding a transform coefficient can include a step that is referred as context update. In the context update step, after a bin is coded, the probability associated with the context is updated to reflect the value of the bin.

Mixing of probability models is now described for coding (i.e., encoding or decoding) a sequence $x^n$ of length n. For simplicity, two (2) models are used. However, this disclosure is not so limited and any number of models can be mixed.

Given a probability $p(x^n)$ of a sequence of symbols $x^n$, a good entropy coding engine, such as a well-designed binary arithmetic coding engine, can produce from the probability $p(x^n)$ a binary string of length $-\log(p(x^n))$. As the length of the string is an integer number, "a binary string of length $-\log(p(x^n))$" means a binary string having a length that is the smallest integer that is greater than $-\log(p(x^n))$. Herein, when referring to a sequence of symbols, a superscript of i refers to a sequence having a length of i symbols, and a subscript of i refers to the symbol at position i in the sequence. For example, $x^5$ refers to a sequence of five (5) symbols, such as 11010; whereas $x_5$ refers to the symbol in the $5^{th}$ position, such as the last 0 in the sequence 11010. As such the sequence $x^n$ can be expressed as $x^n = x_1 x_2 \ldots x_n$.

As used herein, probability values, such as the probability $p(x^i)$ of the sub-sequence $x^i$, can have either floating-point or fixed-point representations. Accordingly, operations applied to these values may use either floating-point arithmetic or fixed-point arithmetic.

Given two probabilities $p_1(x^n)$ and $p_2(x^n)$ such that $p_1(x^n) < p_2(x^n)$, the probability $p_1(x^n)$ results in a codeword that is no shorter than the probability $p_2(x^n)$. That is, a smaller probability typically produces a longer codeword than a larger probability.

The underlying probability model from which symbols are emitted in video coding is typically unknown and/or is likely too complex or too costly to be fully described. As such, designing a good model for use in entropy coding can be a challenging problem in video coding. For example, a model that works well for one sequence may perform poorly for another sequence. That is, given a first model and a second model, some sequences might compress better using the first model while other sequences might compress better using the second model.

In some video systems, it is possible to code (i.e., signal in an encoded bitstream) an optimal model for encoding a sequence. For example, given a sequence to be encoded, a video system may encode the sequence according to all or a subset of available models and then select the model that results in the best compression result. That is, it is possible to code the selection of a particular model among a set of more than one models for the sequence. In such a system, a two-pass process may be, implicitly or explicitly, performed: a first pass to determine the optimal model and a second to encode using the optimal model. A two-pass process may not be feasible in, e.g., real-time applications and other delay-sensitive applications.

As mentioned above, multiple models (i.e., models 1, . . . , M) may be available for entropy coding. For a sequence of symbols to be compressed without loss of information, mixing a finite number of models for arithmetic coding can be as good as selecting the best one model, asymptotically. This follows from the fact that the log function is a concave function and that the −log function is a convex function.

From the foregoing, and for a finite sequence $x^n = x_1 x_2 \ldots x_n$ of length n, inequality (1) follows:

$$-\log(\Sigma_{k=1}^{M} w_k p_k(x^n)) \leq \Sigma_{k=1}^{M} w_k(-\log p_k(x^n)) \quad (1)$$

In the inequality (1), $w_k$ denotes the weighting factor of the $k^{th}$ model and $p_k(x^n)$ denotes the joint probability of $x^n$ given by model k. As described above, given a probability $p_k(x^n)$ (i.e., the probability given by model k of the sequence $x^n$) and $x^n$ as the input, an entropy coding engine can map $x^n$ into a binary codeword of length that is approximately equal to $-\log p_k(x^n)$.

From the inequality (1), it follows that taking the linear (i.e., weighted) sum of the probabilities (i.e., $\Sigma_{k=1}^{M} w_k p_k(x^n)$) for the available models and then taking the logarithm of the linear sum is always less than or equal to taking the logarithms of the probabilities (log $p_k(x^n)$) of the models 1, . . . , M and then performing a linear sum using the same weighting factors $\{w_k\}$. That is, the left-hand-side of the inequality is always less than or equal to the right-hand-side of the inequality.

It also follows from the inequality (1) that, given M models, it is more advantageous to mix the probabilities of the models 1, . . . , M before entropy coding a symbol. That is, it may be more advantageous to mix the probabilities of multiple models before entropy coding than to choose models according to probabilities and using each model to individually code a sequence of bits. Mixing distinct models is likely to improve compression performance (i.e., reduces compression rate) and is no worse than selecting and coding the best model and then to code a sequence using the selected model.

The probability $p_k(x^n)$ is a joint probability of the sequence $x^n$. As coding $x^n$ jointly can incur significant delay in processing and high computational complexity, mixing has found limited use, if at all, in video coding.

For any sub-sequence of length i of the sequence $x^n$ where $1 \leq i \leq n$, probability $p_k(x^i)$ denotes the probability of the subsequence $x^i$ estimated by using model k, where k=1, 2. Using a corresponding weighting factor $w_k$ for each model, the two models can be mixed using equation (2):

$$\tilde{p}(x^i) = w_k p_k(x^i), \text{ for each } i \quad (2)$$

In equation (2), $\tilde{p}(x^i)$ is the mixed probability of the sub-sequence $x^i$. As such, the mixing can produce partial (or intermediate) results for each sub-sequence $x^i$. The sub-sequence $x^i$ is $x^i = x_1 x_2 x_3 \ldots x_1$. The first model (i.e., k=1) produces the sub-sequence probability $p_1(x^i)$; and the second model (i.e., k=2) produces the sub-sequence probability $p_2(x^i)$.

In an example, and as it may not be known, a priori, which model should have the priority, a simple mixture can be used. For example, uniform weighting can be used. That is, the weight factors $w_k$ can be chosen such that $w_k = \frac{1}{2}$. As such, the equation (2) can be re-written as:

$$\tilde{p}(x^i) = \frac{1}{2} \Sigma_{k=1}^{2} p_k(x^i), \text{ for each } i \quad (3)$$

The mixed probability $\tilde{p}(x^i)$ is the probability of a sub-sequence. However, arithmetic coding is performed on a symbol-by-symbol basis (i.e, not on sequences of symbols). As such, the mixed probability $\tilde{p}(x^i)$ cannot directly be used by for entropy coding. This can be addressed by converting the mixed probability $\tilde{p}(x^i)$ into a product of conditional probabilities as described below. It is also noted that the mixed probability $\tilde{p}(x^i)$ is itself a conditional probability: it is the probability of a symbol at position i having a certain value given that the previous symbols result in the sub-sequence $x^{i-1}$. That is, the mixed probability $\tilde{p}(x^i)$ can be given by equation (4):

$$\tilde{p}(x^i) = \tilde{p}(x_i | x^{i-1}) \quad (4)$$

Using the elementary conditional probability formula $P(A|B) = P(A \cap B)/P(B)$, where $P(A \cap B)$ is the probability of both events A and B occurring, the equation (4) can be rewritten as equation (5):

$$\tilde{p}(x^i) = \tilde{p}(x_i | x^{i-1}) = \tilde{p}(x_i \cap x^{i-1})/\tilde{p}(x^{i-1}) = \tilde{p}(x^i)/\tilde{p}(x^{i-1}) \quad (5)$$

It is noted that the mixed probability of both $x_i$ and $x^{i-1}$ occurring is the same as the mixed probability of $x^i$ alone because the sub-sequence $x^i$ includes the sub-sequence $x^{i-1}$ and has the symbol $x_i$.

The equation (5) can be rewritten using the equation (3). That is, each of the sub-sequence mixed probabilities (i.e., the numerator and denominator) of equation (5) can be rewritten in terms of the model probabilities. The equation (5) can be rewritten as equation (6):

$$\tilde{p}(x^i) = \frac{1}{2} \Sigma_{k=1}^{2} p_k(x^i) / \frac{1}{2} \Sigma_{k=1}^{2} p_k(x^{i-1}) \quad (6)$$

$$= \frac{p_1(x^i)}{\Sigma_{k=1}^{2} p_k(x^{i-1})} + \frac{p_2(x^i)}{\Sigma_{k=1}^{2} p_k(x^{i-1})}$$

Multiplying the first quantity and the second quantity of the equation (6) each by a factor equaling one (1)

$$\left(\text{i.e., } \frac{p_1(x^i-1)}{p_1(x^{i-1})} \text{ and } \frac{p_2(x^i-1)}{p_2(x^{i-1})},\right.$$

respectively), equation (7) is obtained:

$$\tilde{p}(x^i) = \frac{p_1(x^{i-1})}{\Sigma_{k=1}^{2} p_k(x^{i-1})} * \frac{p_1(x^i)}{p_1(x^{i-1})} + \frac{p_2(x^{i-1})}{\Sigma_{k=1}^{2} p_k(x^{i-1})} * \frac{p_2(x^i)}{p_2(x^{i-1})} \quad (7)$$

Equation (7) can be written as equation (8):

$$\tilde{p}(x^i) = w_{i,1} * p_1(x_i | x^{i-1}) + w_{i,2} * p_2(x_i | x^{i-1}) \quad (8)$$

It is noteworthy that the conditional probabilities of $p_1(x_i | x^{i-1})$ and $p_2(x_i | x^{i-1})$ are available as a result of the encoding of a sequence up to the $i^{th}$ symbol. These conditional probabilities are available since entropy encoding encodes one symbol at a time and generates a probability for the codeword (up to and including $x_i$) with every symbol. In implementations according to this disclose, the conditional probabilities are mixed and the sequence is then encoded (or decoded) using the mixed probability (i.e., $\tilde{p}(x^i)$).

In equation (8), $w_{i,1}$ and $w_{i,2}$ are weights that are respectively equal to $$\frac{p_1(x^{i-1})}{\Sigma_{k=1}^{2} p_k(x^{i-1})} \text{ and } \frac{p_2(x^{i-1})}{\Sigma_{k=1}^{2} p_k(x^{i-1})},$$

and $p_1(x_i|x^{i-1})$ and $p_2(x_i|x^{i-1})$ are respectively equal to $$\frac{p_1(x^i)}{p_k(x^{i-1})} \text{ and } \frac{p_2(x^i)}{p_k(x^{i-1})}.$$

As such, the mixed probability $\tilde{p}(x^i)$ is now expressed as a linear combination of the conditional probability of the first model (i.e., $p_1(x_i|x^{i-1})$) and the conditional probability of the second model (i.e., $p_2(x_i|x^{i-1})$) where each of the conditional probabilities is multiplied by a respective weighting factor.

When the joint distributions are mixed using the equation (3), uniform weighting factors (i.e., ½) were used. However, when conditional probabilities are used mixed (as in the equation (8)), the weighting (i.e., $w_{i,1}$ for the first model and $w_{i,2}$ for the second model) may no longer be uniform. The weight $w_{i,1}$ for the conditional probability of the first model is equal to the joint probability of $x^{i-1}$ given by the first model divided by the sum of the joint probability of $x^{i-1}$ given by the first model and the joint probability of $x^{i-1}$ given by the second model. Similarly for weight $w_{i,2}$. In equation (8), for the sub-sequence $x^{i-1}$, the first model provides a first probability and the second model provides a second probability and the weighting factor for the conditional probability of $x_i$ given $x^{i-1}$ is equal to the probability given by each of the first model and the second model divided by the sum of the joint probabilities given by both models. That is, in the mixing of the conditional probabilities, if, for example, the first model provides a higher probability for the sub-sequence $x^{i-1}$, then the first model ends up having a higher weighting factor (i.e., weight $w_{i,1}$) than that of the second model.

The joint probabilities are real numbers and the calculating of the weights $w_{i,1}$ and $w_{i,2}$ involves the division of real numbers. As such, the computing of the weights $w_{i,1}$ and $w_{i,2}$ may be complex and expensive. It is desirable to approximate the weights $w_{i,1}$ and $w_{i,2}$ with fixed-point representations such that, for example, the exact number of bits to represent each of the weights can be known and such that division operations can be avoided.

As described above, there is a correlation and/or relationship between the probability of a codeword and the length, in bits, of the codeword generate using the probability. Namely, the length (i.e., number of bits) of the codeword is given by $-\log_2(p)$. The lengths of the codewords generated by each model can be used to approximate the weights $w_{i,1}$ and $w_{i,2}$. That is, $-\log(p_k(x^{i-1}))$ can be approximated by the codeword length $l_k(x^{i-1})$ in bits resulting from using model k, k=1,2, to encode $x^{i-1}$. As such, the weight $w_{i,1}$ (and for the weight $w_{i,2}$) can be approximated using equation (9):

$$w_{i,1} = \frac{p_k(x^{i-1})}{\sum_{j=1}^{2} p_j(x^{i-1})} \approx \frac{2^{-l_1(x^{i-1})}}{\sum_{j=1}^{2} 2^{-l_j(x^{i-1})}} = \frac{1}{1+2^{l_1(x^{i-1})-l_2(x^{i-1})}} \quad (9)$$

When $l_2(i-1)$ is equal to $l_1(i-1)$, then it follows that $w_{i,1}=w_{i,2}=0.5$. Assuming, without losing generality, that $l_1(i-1)$ is smaller than $l_2(i-1)$, then the equation (9) can result by expanding the denominator and then eliminating $2^{-l_1(x^{i-1})}$ from the denominator and numerator.

To determine a length $l_k(x^i)$ according to a model k of a sub-sequence of length i, a hypothetical encoding process can be used. A hypothetical encoding process is a process that carries out the coding steps but does not generate actual codewords or output bits into an encoded bitstream. Since the purpose is to estimate $l_k(x^i)$, which are interpreted in some applications as a bitrate (or a simply rate), a hypothetical encoding process may be regarded or called a rate estimation process. The hypothetical encoding process, using a probability model, computes or estimates the codeword length for a sequence. The codeword length may be determined (i.e., measured) with or without generating a codeword. For example, at time instance i, coding the sequence $x^{i-1}$ using a first model generates a codeword of length $l_1(i-1)$ and using a second model generates a codeword of length $l_2(i-1)$. In an example, multiple hypothetical encoders can be available and executing in parallel. For example, a standard rate estimator for an arithmetic encoder can be available for each model. Each rate estimator can provide (or, can be used to provide) an estimate of the length of the codeword that may be produced by the encoder for a sub-sequence given a model.

Given two competing models at a time instance i, if the first model provides less bits than the second model, then the weight assigned (using equation 9) to the first model will be greater than the weight assigned to the second model for the sequence up to the symbol at position $x_{i-1}$. Eventually (i.e., when encoding the sequence $x^n$ is completed using the mixed probability), the winning model (i.e., the model with higher weight) is the model that produces less bits, which is the desired result of compression.

The weight $w_{i,1}$ is approximated (in equation (9)) using a power of 2 and, as such, can be efficiently computed.

The weight $w_{i,1}$ can be further simplified. The right-hand-side of the equation (9) is of the form $1/(1-r)$ where $r=-2^{l_1(x^{i-1})-l_2(x^{i-1})}$. This can be recognized as a geometric series given by $1+r+r^2+\ldots$ with a common ratio $r=-2^{l_1(x^{i-1})-l_2(x^{i-1})}$. As such, The weight $w_{i,1}$ can be approximated using equation (10):

$$w_{i,1} \approx \sum_{j=0}^{\infty}(-2^{l_2(x^{i-1})-l_2(x^{i-1})})^j \quad (10)$$

As such, $w_{i,1}*p_1(x_i|x^{i-1})$ of the equation (8) can be rewritten as in equation (11):

$$w_{i,1}p_1(x_i|x^{i-1})=\sum_{j=0}^{\infty}(-2^{l_1(x^{i-1})-l_2(x^{i-1})})^j p_1(x_i|x^{i-1})=\sum_{j=0}^{\infty}(-1)^j 2^{j[l_1(x^{i-1})-l_2(x^{i-1})]}p_1(x_i|x^{i-1}) \quad (11)$$

In equation (11), $2^{j[l_1(x^{i-1})-l_2(x^{i-1})]}p_1(x_i|x^{i-1})$ can be efficiently computed by using shifts in cases where $p_1(x_i|x^{i-1})$ has a fixed-point representation. Moreover, when $p_1(x_i|x^{i-1})$ has a fixed-point representation, then the infinite sum in equation (11) can be truncated into a sum of a finite number of terms. For example, when $p_1(x_i|x^{i-1})$ has an 8-bit representation, then the sum can be truncated to keep only the first eight (8) terms $\sum_{j=0}^{7}(-1)^j 2^{j[l_1(x^{i-1})-l_2(x^{i-1})]}p_1(x_i|x^{i-1})$ since for any j≥8, $2^{j[l_1(x^{i-1})-l_2(x^{i-1})]}p_1(x_i|x^{i-1})=0$ when $l_1(x^{i-1})-l_2(x^{i-1}) \leq -1$ (that is, when they differ by at least one bit). When, $l_1(x^{i-1})-l_2(x^{i-1})<-1$, (that is, when they differ by more than one bit), $2^{j[l_1(x^{i-1})-l_2(x^{i-1})]}p_1(x_i|x^{i-1})=0$ for any j≥j* where j*<8. As such, only the first j* terms are needed to compute $w_{i,1}p_1(x^i|x^{i-1})$.

The weight $w_{i,2}$ can be computed using equation (12):

$$w_{i,2} \approx \frac{2^{-l_1(x^{i-1})}}{\sum_{j=1}^{2} 2^{-l_j(x^{i-1})}} = \quad (12)$$

-continued $$\frac{2^{l_1(x^{i-1})-l_2(x^{i-1})}}{1+2^{l_1(x^{i-1})-l_2(x^{i-1})}} = 2^{l_1(x^{i-1})-l_2(x^{i-1})} \sum_{j=0}^{\infty} \left(-2^{l_1(x^{i-1})-l_2(x^{i-1})}\right)^j$$

The quantity $w_{i,2}*p_2(x_i|x^{i-1})$ of equation (8) can be computed using equation (13):

$$w_{i,2}p_2(x^i|x^{i-1}) = 2^{l_2(x^{i-1})-l_2(x^{i-1})} \Sigma_{j=0}^{\infty} (-2^{l_1(x^{i-1})-l_2(x^{i-1})})^j p_2(x_i|x^{i-1}) = \Sigma_{j=0}^{\infty} (-1)^j 2^{(j+1)[l_1(x^{i-1})-l_2(x^{i-1})]} p_2(x_1|x^{i-1}) \quad (13)$$

As in equation (11), the right hand side of equation (13) can be simplified by truncating the infinite sum into a finite sum when $p_2(x_i|x^{i-1})$ has a fixed-point representation.

As described above, mixing of joint probabilities of models can use simple uniform mixing as it may not be known a priori which model provides better compression. The uniform mixing of the joint probabilities uses conditional probabilities and results in the selection of a winning model (i.e., a model with higher weighting).

Figure 9:
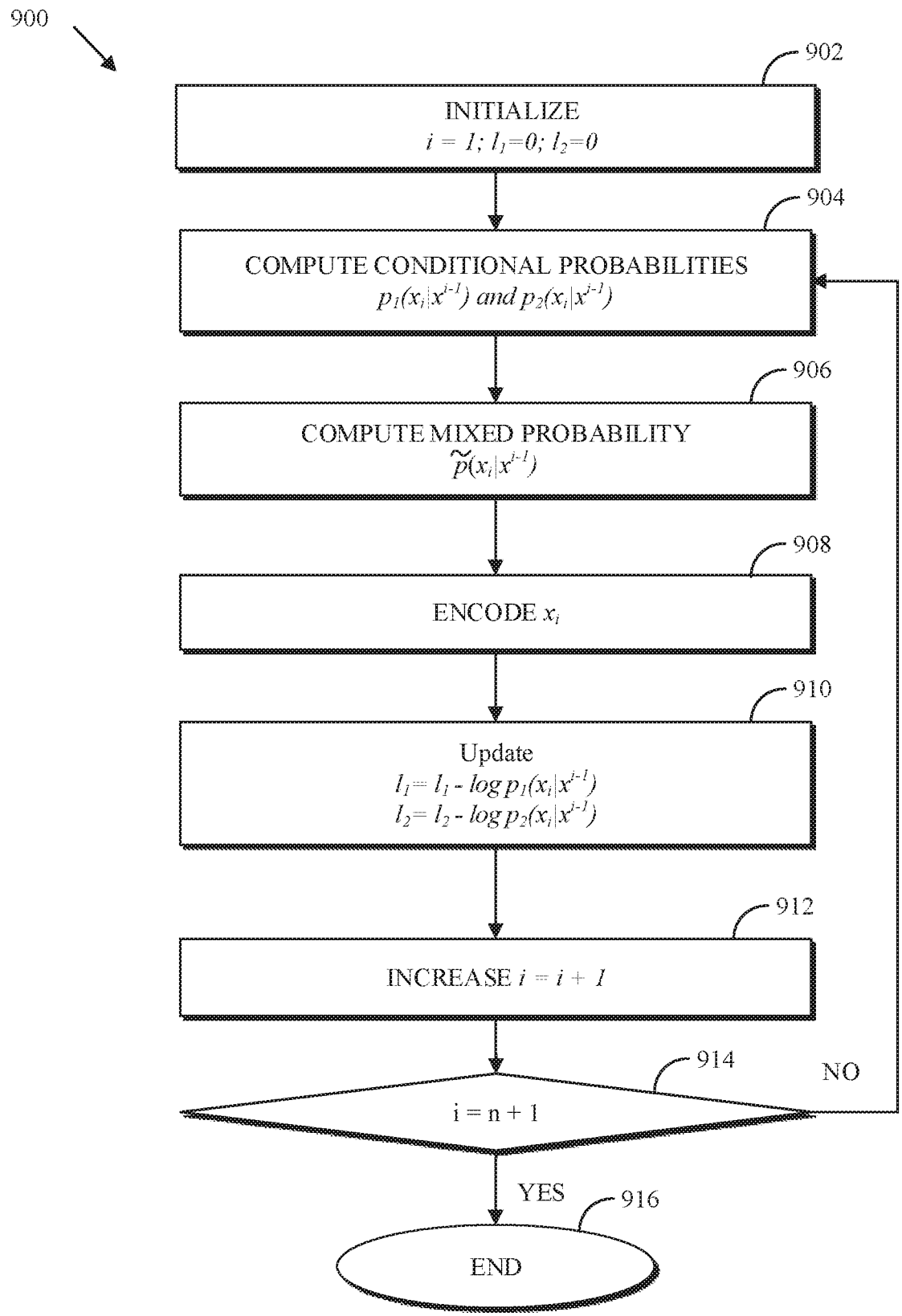
FIG. 9 is a flowchart diagram of a process for encoding a sequence of symbols according to an implementation of this disclosure.

FIG. 9 is a flowchart diagram of a process 900 for encoding a sequence of symbols according to an implementation of this disclosure. The process 900 can receive a sequence of symbols of size n. The sequence can be denoted by $x^n$. Receive, can mean generate, determine, or in any way receive. In an example, the sequence of symbols can represent a quantized transform coefficient such as one received at the entropy encoding stage 408 from the quantization stage 406 of FIG. 4. In an example, the sequence of symbols can be a token such as a token described with respect to FIG. 7. In an example, the sequence of symbols can be a binarized value such as a binarized value described with respect to FIG. 8. The sequence of symbols can be any sequence of symbols that is encoded based on a probability model.

The process 900 can be implemented in an encoder such as the encoder 400 of FIG. 4. The process 900 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 900. In at least some implementations, the process 900 can be performed in whole or in part by the entropy encoding stage 408 of the encoder 400 of FIG. 4.

The process 900 uses at least two probability models to encode the sequence of symbols $x^n$. The process 900 can use any number of probability models. However, for simplicity only two (2) models (i.e., a first model and a second model) are used to illustrate the process 900. The process 900 encodes each of the symbols of the sequence the symbols by mixing the probabilities of the first model and the second model.

At 902, the process 900 initializes a counter i to 0, a first sub-sequence length (i.e., first length $l_1$) to 0, and a second sub-sequence length (i.e., second length $l_2$) to 0. The counter i is used for each symbol of the sequence $x^n$. The first length $l_1$ and the second length $l_2$ are as described above. That is, the first length $l_1$ and the second length $l_2$ can correspond, respectively, to the lengths of a codewords generated by arithmetic coding engines using the first model and the second model.

At 904, the process 900 determines the conditional probabilities $p_1(x_i|x^{i-1})$ and $p_2(x_i|x^{i-1})$ as described above. The conditional probability $p_1(x_i|x^{i-1})$ is the conditional probability of the symbol at position i of the sequence of symbols given the probability of the subsequence $x^{i-1}$ (i.e., the subsequence up to and excluding the symbol $x_i$). Similarly for $p_2(x_i|x^{i-1})$.

At 906, the process 900 computes the mixed probability $\tilde{p}(x_i|x^{i-1})$ for the symbol $x_i$. The process 900 can determine the mixed probability described in equation (4) above. The process 900 can compute the mixed probability using the equations 8, 11, and 13. At 908, the process 900 encodes the symbol $x_i$ using the computed mixed conditional probability.

At 910, the process 900 updates the first length $l_1$ and the second length $l_2$. As described above, hypothetical arithmetic encoders can be used at 910. The first length $l_1$ is updated to include the additional codeword length (i.e., bits) added to the hypothetical codeword added by the first model when encoding the symbol $x_i$. The second length $l_2$ is updated to include the additional codeword length (i.e., bits) added to the hypothetical codeword added by the second model when encoding the symbol $x_i$. The process 900, updates the first length $l_1$ and the second length $l_2$ using, respectively, $l_1 = l_1 - \log(p_1(x_i|x^{i-1}))$ and $l_2 = l_2 - \log(p_2(x_i|x^{i-1}))$. In an implementation, the values $-\log(p_1(x_i|x^{i-1}))$ and $-\log(p_2(x_i|x^{i-1}))$ can be computed and/or approximated by using a lookup table. Note that the probabilities $p_1(x_i|x^{i-1})$ and $p_2(x_i|x^{i-1})$ are probabilities between zero (0) and one (1). If $p_1(x_i|x^{i-1})$ and $p_2(x_i|x^{i-1})$ are each represented and/or approximated using an 8-bit integer (e.g., they have fixed-point representations), then both $-\log(p_1(x_i|x^{i-1}))$ and $-\log(p_2(x_i|x^{i-1}))$ can be estimated by using a lookup table that takes 8-bit integers as inputs, where each input corresponds to a probability value. In general, the size of the lookup table depends upon the width of the fixed point representation of $p_1(x_1|x^{i-1})$ and $p_2(x_i|x^{i-1})$. That is, the larger the width, the higher the precision in estimating $-\log(p_1(x_1|x^{i-1}))$ and $\log(p_2(x_1|x^{i-1}))$.

At 912, the counter i is incremented so that the next symbol $x_{i+1}$ is processed. At 914, if all the symbols have been processed (i.e., i=n+1), then the process terminates at 916. Otherwise, the process returns to 904 to process the next symbol.

Figure 10:
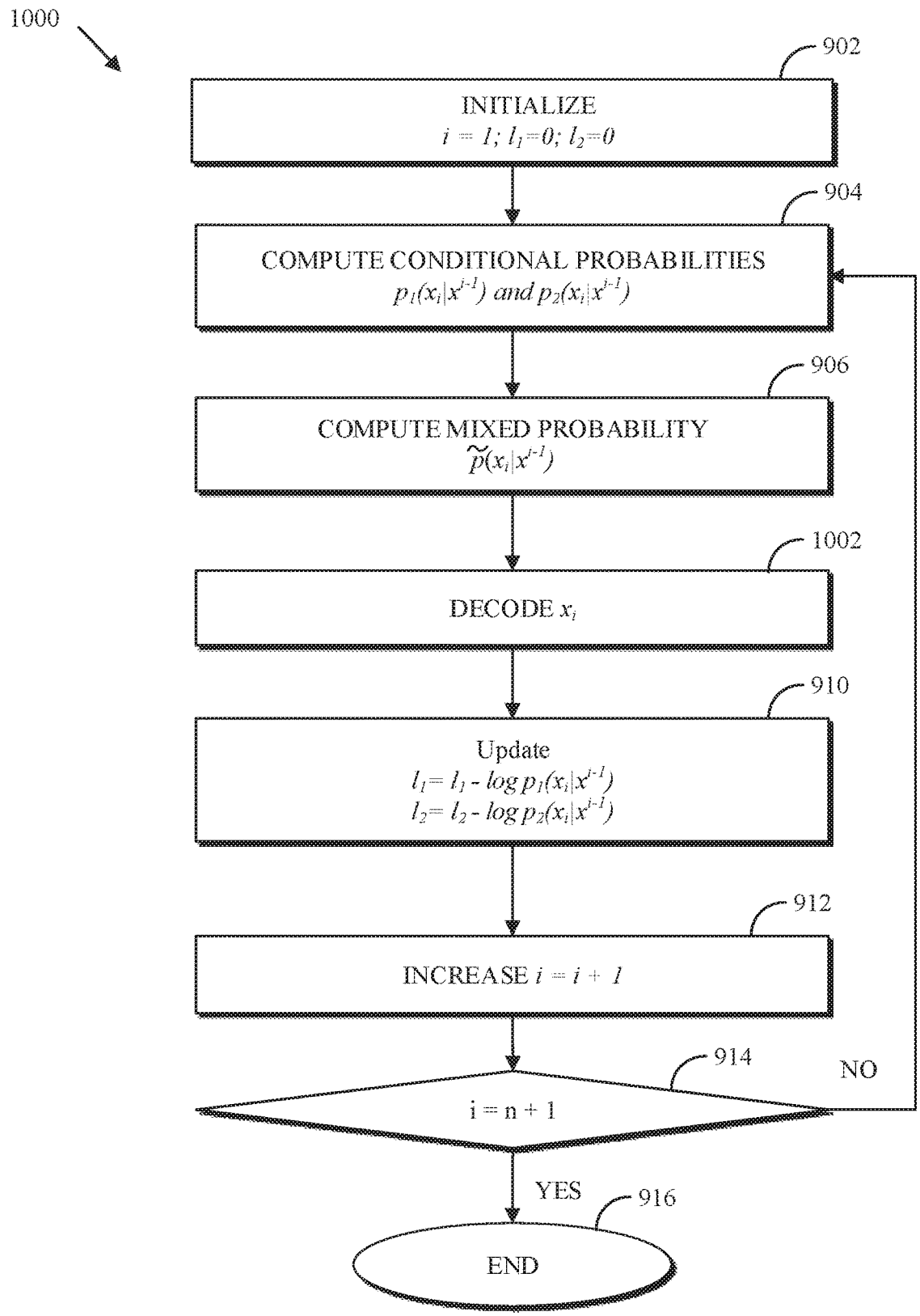
FIG. 10 is a flowchart diagram of a process for decoding a sequence of symbols according to an implementation of this disclosure.

FIG. 10 is a flowchart diagram of a process 1000 for decoding a sequence of symbols according to an implementation of this disclosure. The process 1000 can be implemented in a decoder such as the decoder 500. The process 1000 can be implemented by a receiving station. The process 900 can be implemented, for example, as a software program that can be executed by computing devices. The software program can include machine-readable instructions that can be stored in a memory such as the memory 204 or the secondary storage 214, and that can be executed by a processor, such as CPU 202, to cause the computing device to perform the process 900. The process 900 can be implemented using specialized hardware or firmware. Some computing devices can have multiple memories, multiple processors, or both. The steps or operations of the process 1000 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1000 can be used to decode a sequence of symbols from an encoded bitstream. For example, the process 1000 can receive an encoded bitstream, such the compressed bitstream 420 of FIG. 5. The process 1000 can include steps similar to the steps 902-906 and 910-916 as the process 900. Descriptions of the similar steps are omitted. Instead of the step 908, the process 1000 includes the step 1002. At the step 1002, the process 1000 decodes, from an encoded bitstream, the symbol $x_i$ using the computed mixed conditional probability (i.e., $\tilde{p}(x_i|x^{i-1})$).

In some implementations of the processes 900 or 1000, step 906 may be performed every k>1 steps to further save (e.g., reduce) computational complexity or to improve throughput. Throughput can be measured in the number symbols processed (coded or decoded) in one clock cycle. For example, when k=2, step 906 may be performed only when i is odd or even, but not both. In another implementation of the processes 900 or 1000, step 906 may be performed at a predefined subset of all possible indices of i.

The foregoing described the use of uniform weighting of the models. However, implementations according to this disclosure can use non-uniform prior weights. In non-uniform weighting using M number of models, at least some of the weights $w_k$ can be set to values that are not equal to 1/M (i.e., $w_k \neq 1/M$).

For simplicity, the foregoing (e.g., the processes 900 and 1000) describes the use of two models: a first model and a second model. However, implementations according to this disclosure can be extended to any number of models. For example, for a number of model M≥2, and assuming uniform weighting factors $w_k$ (i.e., $w_k=1/M$), then the weights $w_{i,k}$ can be approximated using formula (14):

$$w_{i,k} \approx \frac{w_k 2^{-l_k(x^{i-1})}}{\sum_{j=1}^{M} w_j 2^{-l_j(x^{i-1})}} \tag{14}$$

In formula 14, $l_k(x^{i-1})$ denotes the codeword length, in bits, resulting from using model k, 1≤k≤M, to encode the sub-sequence $x^{i-1}$.

In the case where more than two (2) models are mixed, a binary tree can be used to compute (i.e., determine, generate, etc.) the conditional probabilities. That is, the factors $w_{i,k}p_k(x_i|x^{i-1})$ of equation (8) can be recursively computed using the above-described processes. Recursively computing means combining the probabilities of two (2) models at a time to produce intermediate conditional probabilities. The intermediate conditional probabilities are then combined, two at a time. In the case where the number of models M is a power of 2 (i.e., $M=2^m$), the factors $w_{i,k}p_k(x_i|x^{i-1})$ of equation (8) can be recursively computed by applying the above described processes on a full binary tree such as described with respect to FIG. 11.

Figure 11:
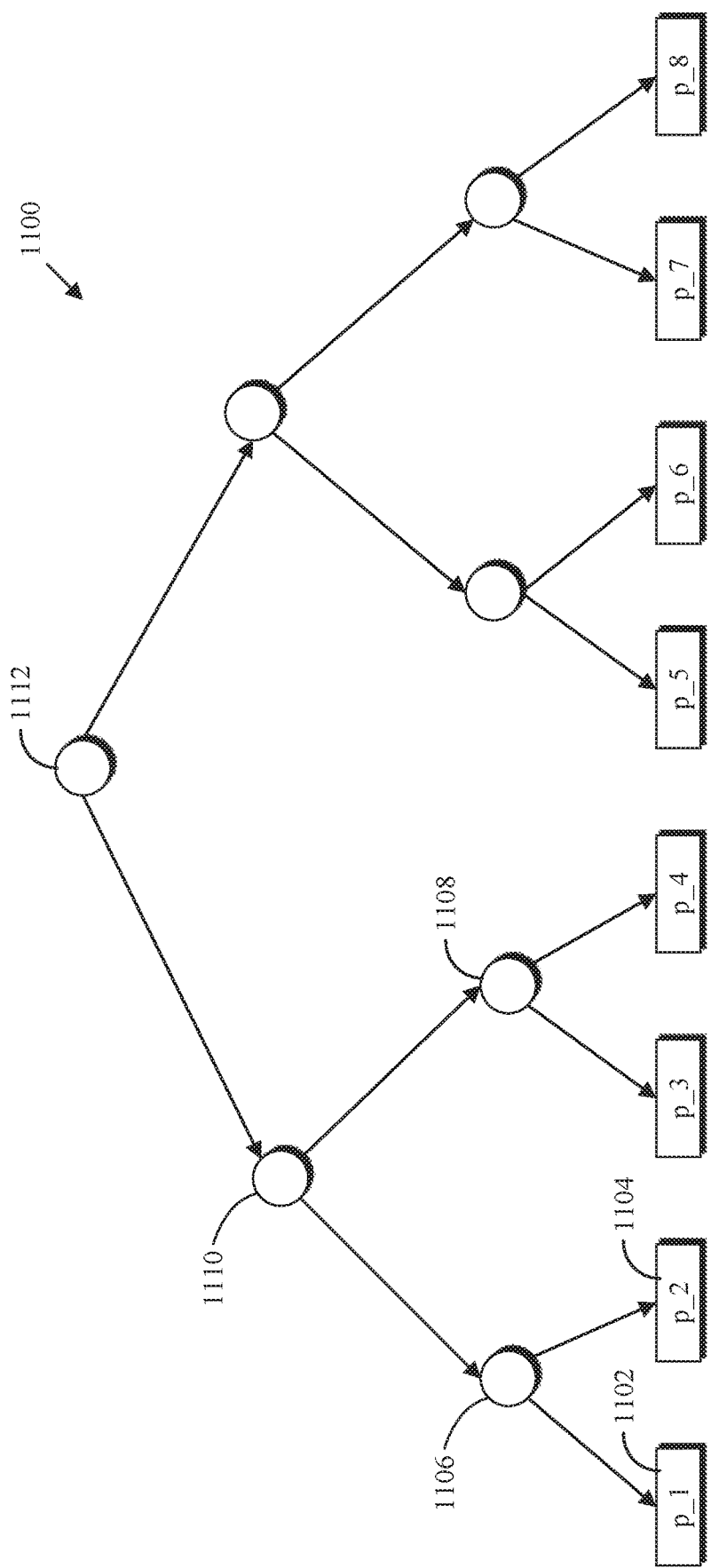
FIG. 11 is a diagram of an example of a binary tree of conditional probabilities according to an implementation of this disclosure.

FIG. 11 is a diagram of an example of a binary tree 1100 of conditional probabilities according to an implementation of this disclosure. In the binary tree 1100, eight (8) models are mixed. The probabilities of the eight models are p_1 to p_8. Every two probabilities are first mixed. For example, the probabilities 1102 and 1104 are mixed as described above to generate intermediate conditional probability 1106, which is then combined with the intermediate conditional probability 1108 to produce intermediate conditional probability 1110, and so on until a final conditional probability 1112 is computed. The final conditional probability 1112 can be used for encoding and/or decoding. For example, the final conditional probability 1112 can be used at 908 of the process 900 and/or at 1002 of the process 1000.

The process described with respect to FIG. 11 can be used in situations where, for example, some models are known to be more useful than other models. In the case where some models are known to be more useful than others, uniform weighting may be undesirable. In order to assign more weight to one model, the model can be replicated in the tree.

Referring to FIG. 11 as an example, the models p_1-p_6 and p_8 may be distinct and p_6 is known to be more useful than the other models. As p_6 is more useful, p_6 can be replicated in the tree: p_7 is a duplicate of p_6. As such, the model with probability p_6 is assigned twice the weight in the mixing for entropy encoding.

As another example, suppose, for example, there are two models, model A and model B, and the prior weights for the two models are (¼, ¾). Implementations according to this disclosure, can expand the model set to a set of 4 models, where the first model corresponds to the model A, the remaining three models correspond to the model B, and the prior for the four models is (¼, ¼, ¼, ¼).

In the foregoing, stationary sources are described. A stationary source means that the mixing for the symbol $x_i$ uses all the history of the sub-sequence $x^{-1}$ to determine $w_{i,k}$. As such, the statistics do not change over the source of the coding process. However, in the cases where the sources may be non-stationary, implementations according this disclosure can adapt to the local statistics for better compression performance using a sliding window. The sliding window as length L of bits indicating the number of previous bits (i.e., the probabilities of the number of the previous bits) to be used in the mixing process. That is, the sliding window represents how far back into the sequence to remember: only symbols inside the sliding window are used to estimate the weighting factors. More specifically, only the probabilities of those symbols inside the sliding window are used to estimate the weighting factors.

As such, instead of using $\tilde{p}(x_i|x^{i-1})$ to code $x_i$, $\tilde{p}(x_i|x_{i-L} \ldots x_{i-1})$ where the length L≥1 is the length of the sliding window and where $x_{i-L} \ldots x_{i-1}$ is the sub-sequence starting at bit i−L and ending at bit i−1. When the length L is known, a process according to this disclosure can perform the following steps for two models:

At step 1, initialize i=1, $l_1=0$, $l_2=0$. The step 1 can be as described with respect to 902 of FIG. 9. At step 1, the process also initializes $l_{1,-L}=0$, and $l_{2,-L}=0$.

At step 2, the process computes $p_1(x_i|x_{i-L} \ldots x_{i-1})$ and $p_2(x_i|x_{i-L} \ldots x_{i-1})$ according to the first model and the second model.

At step 3, the process computes the mixed probability $\tilde{p}(x_i|x_{i-L} \ldots x_{i-1})$ according to the equations 15 and 16:

$$\tilde{p}(x_i|x_{i-L}\ldots x_{i-1}) = w_{i,1}p_1(x_i|x_{i-L}\ldots x_{i-1}) + w_{i,2}p_2(x_i|x_{i-L}\ldots x_{i-1}) \tag{15}$$

$$w_{i,k} \approx \frac{2^{-l_k(x^{i-1})+l_k(x^{i-L-1})}}{\sum_{j=1}^{2} 2^{-l_j(x^{i-1})+l_j(x^{i-L-1})}}, k=1,2 \tag{16}$$

At step 4, the process encodes (when implemented by an encoder) or decodes (when implemented by a decoder) $x_i$ by using $\tilde{p}(x_i|x_{i-L} \ldots x_{i-1})$.

At step 5, the process updates $l_1$ to $l_1=l_1-\log p_1(x_i|x_{i-L} \ldots x_{i-1})$ and updates $l_2$ to $l_2=l_2-\log p_2(x_i|x_{i-L} \ldots x_{i-1})$. If the process is encoding/decoding outside the window (i.e., i>L), then the process updates $l_{1,-L}=l_{1,-L}-\log p_1(x_{i-L}|x_{i-2L} \ldots x_{i-L-1})$ and $l_{2,-L}=l_{2,-L}-\log p_2(x_{i-L}|x_{i-2L} \ldots x_{i-L-1})$.

At step 6, i is increased by 1 (i.e., i=i+1).

At step 7, the process repeats the steps 2-6 until all the bits of the sequence $x^n$ are processed (i.e., i=n+1).

In the sliding window described above, $l_1(x^{i-1})-l_1(x^{i-L-1})=l_1-l_{1,-L}$ and $l_2(x^{i-1})-l_2(x^{i-L-1})=l_2-l_{2,-L}$. As such, $l_1(x^{i-1})-l_1(x^{i-L-1})$ can be regarded as the codeword length produced by using the first model to code $x_{i-L} \ldots x_{i-1}$ and $l_2(x^{i-1})-l_2(x^{i-L-1})$ can be regarded as the codeword length produced by using the second model to code $x_{i-L} \ldots x_{i-1}$.

Figure 12:
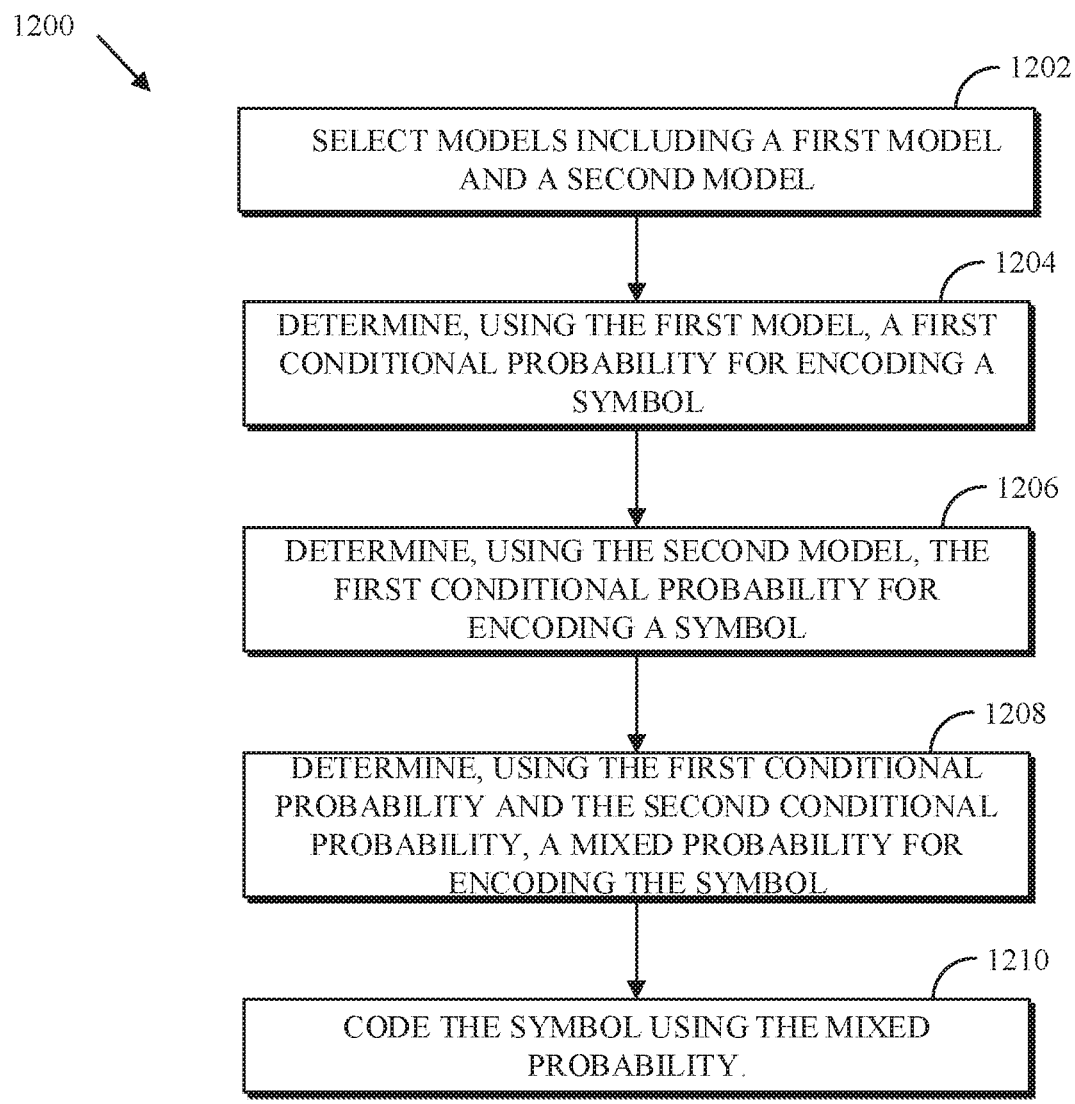
FIG. 12 is a flowchart diagram of a process for entropy coding according to an implementation of this disclosure.

FIG. 12 is a flowchart diagram of a process 1200 for entropy coding a sequence of symbols according to an implementation of this disclosure. The sequence can be as described above for sequences $x^n$. The process 1200 can be implemented by an encoder or a decoder. When implemented by an encoder, "coding" means encoding in an encoded bitstream, such as the compressed bitstream 420 of FIG. 4. When implemented by a decoder, "coding" means decoding from a encoded bitstream, such as the compressed bitstream 420 of FIG. 5.

When encoded by an encoder, the process 1200 can receive the sequence of symbols from a quantization step, such as the quantization stage 406 of FIG. 4. In another example, the process 1200 can receive a value to be encoded (e.g., a quantized transform coefficient) and generates the sequence of symbols from the received value.

At 1202, the process 1200 selects models to be mixed. The models can include a first model and a second model. As used in this disclosure, "select" means to identify, construct, determine, specify or other select in any manner whatsoever.

For at least a symbol (e.g., $x_i$), at a position (e.g., i) of the symbols, the process 1200 performs steps including the steps 1204-1208 to determine a mixed probability using the first model and the second model. The steps 1204-1208 can be performed for all symbols of the sequence of symbols.

At 1204, the process 1200 determines, using the first model, a first conditional probability for encoding the symbol. The first conditional probability is the conditional probability of the symbol given a sub-sequence of the sequence. In an example, the sub-sequence of the sequence can mean the sub-sequence $x^{i-1}$. In another example, wherein a sliding window is being used, the sub-sequence of the sequence consists of a predetermined number of symbols of the sequence before the position. The predetermined number of symbols can be as described with respect to the sliding window length L. As such the sub-sequence of the sequence can be the sub-sequence $x_{i-L} \ldots x_{i-1}$. At 1206, the process 1200 determines, using the second model, a second conditional probability for encoding the symbol. The second conditional probability is a conditional probability of the symbol given the sub-sequence as described with respect to 1204.

At 1208, the process 1200 determines, using the first conditional probability and the second conditional probability, a mixed probability for encoding the symbol. The mixed probability can be as described with respect to 906 of FIG. 9. The first conditional probability and the second conditional probability can be combined using a linear combination that uses a first weight and a second weight. In an implementation, at least the first weight can be determined (i.e., approximated) using a hypothetical arithmetic coding to determine a length for encoding a sub-sequence of the sequence up to the symbol. The first weight can be determined using the length. In an example, determining a weight (e.g., the first weight and/or the second weight) can include determining a rate resulting from encoding a sub-sequence of the sequence up to the symbol and determining the first weight using the determined rate. In an example, the rate can be determined using a rate estimator. In an example, the rate estimator can be a hypothetical arithmetic encoder. In an example, determining the rate can include looking up a table (e.g., a lookup table) with inputs as probability values.

At 1210, the process 1200 codes the symbol using the mixed probability as described, for example, with respect to the 908 (when implemented by an encoder) and 1002 (when implemented by a decoder).

In an implementation of the process 1200, the models can include a third model and a fourth model and determining the mixed probability using the first model and the second model can include mixing the first model and the second model to generate a first intermediate conditional probability, mixing the third model and the fourth model to generate a second intermediate conditional probability, and mixing the first intermediate conditional probability and the second intermediate conditional probability to generate a conditional probability to be used for encoding the symbol. In an implementation, the first model and the fourth model are a same model.

A technique known as context-tree weighting (CTW) is a lossless data compression algorithm that uses mixing. To code a binary sequence $x^n$ of length n, CTW estimates a probability function $p(x^n)$ as a linear mixture of $2^K$ probability functions $p_i(x^n)$, each of which is estimated by assuming a finite memory binary tree source and has the same weighting factor. Contrastingly, implementations according to this disclosure can work with any models. Furthermore, the symbol-by-symbol weighting factor computation described herein can use length functions to approximate probabilities of sub-sequences, which is much simplified in comparison to existing solutions that maintain and compute joint probabilities.

As mentioned above, a key design challenge or problem in context modeling is to balance between the two conflicting objectives of 1) improving compression performance by adding more contexts and 2) reducing the overhead cost associated with contexts.

Using the coefficient token tree 700 as a non-limiting illustration, a mathematical analysis of the impact of the number of contexts in a coding system and the relationship between the number of contexts and the coding performance is now given.

For a context c, let $P_c=(p_{c,0}, \ldots, p_{c,11})$ denote the probability distribution obtained from the context, where $p_{c,i}$ denotes the probability of token i for $i=0, \ldots, 10$ (i.e., the tokens listed in Table I), and $p_{c,11}$ denotes the probability of the EOB_TOKEN. For convenience, the EOB_TOKEN is referred to as token 11. Suppose now that, in a frame, the context c appears and is used $n_c$ times. A context "appears" when, for example, the conditions associated with context are met and/or are available for the frame. The context is "used" when, for example, the probability distribution associated with the context is used in the coding of at least one block of the frame. Let $Q_c=(q_{c,0}, \ldots, q_{c,11})$ denote the empirical (i.e., observed) distribution of the coefficient tokens under context c. That is, $q_{c,i}$ denotes the number of times that token i appears in the frame under the context c and can be given by $$q_{c,i} = \frac{n_{c,i}}{n_c}$$

(i.e., the number of times that the token i appeared in the frame under the context c divided by the number of times that the context c appeared). The probability distributions $P_c$ and $Q_c$ can be referred to, respectively, as the coding distribution and the actual distribution used to code a tokens.

Given the coding distribution $P_c$, the compression performance achievable by using arithmetic coding can be given by $$\sum_{i=0}^{11} n_{c,i} \log \frac{1}{p_{c,i}}.$$

Using the actual distribution $$Q_c, q_{c,i} = \frac{n_{c,i}}{n_c},$$

and the law of logarithms log(fraction)=log(numerator)−log(denominator), the achievable compression performance can be reduced as in equation (17)

$$\sum_{i=0}^{11} n_{c,i} \log \frac{1}{p_{c,i}} = \qquad (17)$$

$$n_c \sum_{i=0}^{11} q_{c,i} \log \frac{1}{p_{c,i}} = n_c \sum_{i=0}^{11} q_{c,i} \log \frac{1}{q_{c,i}} + n_c \sum_{i=0}^{11} q_{c,i} \log \frac{q_{c,i}}{p_{c,i}}$$

The first term $$\sum_{i=0}^{11} q_{c,i} \log \frac{1}{q_{c,i}}$$

of the right hand side of equation (17) can be recognized as the entropy $H(Q_c)$ of the actual distribution $Q_c$. The second term $$\sum_{i=0}^{11} q_{c,i} \log \frac{q_{c,i}}{p_{c,i}}$$

of the right hand side of equation (1) can be recognized as the relative entropy or the Kullback-Leibler (KL) divergence, defined on the same alphabet (e.g., the tokens of the coefficient token tree 700), between the distributions $P_c$ and $Q_c$. The KL divergence can be denoted $D(Q_c \| P_c)$. As such, the compression performance achievable by using arithmetic coding can be rewritten using equation (18):

$$\sum_{i=0}^{11} n_{c,i} \log \frac{1}{p_{c,i}} = n_c H(Q_c) + n_c D(Q_c \| P_c) \qquad (18)$$

The second term (i.e., $D(Q_c \| P_c)$) is indicative of the loss in compression performance that results when, instead of using the most optimal probability distribution (i.e., the actual distribution $Q_c$), another less optimal probability distribution (i.e., the coding distribution $P_c$) is used. When there are differences between the actual and coding probability distributions, a compression performance loss results. The loss grows linearly with the sequence length being encoded.

The equation (18) can be used as the basis for designing compression algorithms. That is, a compression algorithm is analyzed using the equation (18). The design of context modeling directly affects the compression performance. As such, a good design of context modeling (i.e., optimal selection of contexts) results in a good compression algorithm. With optimal context modeling, the first term $H(Q_c)$ and the second term $D(Q_c \| P_c)$ are minimized.

Both terms of the equation (18) (i.e., $n_c H(Q_c)$ and $n_c D(Q_c \| P_c)$) grow linearly with the number $n_c$ of times that the context c appears. It can be appreciated that, in order to improve the compression performance of entropy coding, the two terms, $H(Q_c)$ and $D(Q_c \| P_c)$ of equation (18) should be made as small as possible.

As the second term $D(Q_c \| P_c)$ is always a non-negative value, and $D(Q_c \| P_c)=0$ if and only if the actual and coding distributions are equivalent (i.e., $Q_c \equiv P_c$), the first term (i.e., $n_c H(Q_c)$) is the absolute theoretical lower bound for any compression algorithm. Said another way, given a sequence $n_c$ with a probability distribution $Q_c$, the best possible compression is given by $n_c H(Q_c)$ and no other probability distribution can provide better compression.

Accordingly, in order to achieve good compression performance, it is desirable that the coding distribution $P_c$ be as close as possible to the actual distribution $Q_c$. For a same context, the actual distributions change from one frame to another. As such, the coding distribution $P_c$ should be adapted to the actual distribution $Q_c$ of a given frame to be decoded. As the frame is yet to be decoded, a decoder cannot know how to adjust the coding distribution $P_c$.

Instead, an adjusted coding distribution $P_c$ can be signaled by an encoder. For example, an encoder can encode the adjusted coding distribution $P_c$ in the frame header of the frame to be decoded. Encoding the adjusted coding distribution $P_c$ can mean that the encoder encodes the token probabilities $p_{c,i}$ of the coding distribution $P_c$.

Suppose that the cost, in bits (or more accurately, in partial bits), of encoding the token probabilities $p_{c,i}$ is lower-bounded by a bit cost $\varepsilon > 0$. That is, bit cost c is the smallest number of bits required to encode a token probability $p_{c,i}$.

For a context c, the total bit cost, amortized over the frame, of coding the coding distribution $P_c$, which includes the probabilities of the 12 tokens of the Table I and the EOB_TOKEN, can be given by $11\varepsilon/n_c$. The total bit cost is inversely proportional to $n_c$ and grows linearly with the alphabet size (e.g., the number of tokens). Since the coding distribution $P_c$ is a probability distribution (i.e., $\Sigma_{i=0}^{11} p_{c,i} = 1$), its degree of freedom is equal to the alphabet size (e.g., 12 tokens) minus one (1). Hence, the 11, instead of 12 (corresponding to the number of tokens) in the bit cost $11\varepsilon/n_c$.

Let C denote the set of all contexts used in transform coefficient coding. To transmit a coding probability distribution for a context c of the set C to a decoder (the decoder can use to decode tokens corresponding to, e.g., nodes of the coefficient token tree 700 of FIG. 7), a probability corresponding to each token of the coefficient token tree 700 and the EOB_TOKEN may be encoded. As there are 12 tokens, the total bit cost of coding probability distributions obtained from contexts in the set C, amortized over a frame, is given by equation (19):

$$\text{Total bit cost} = \frac{11|C|\varepsilon}{n} \text{ bits/token} \qquad (19)$$

In equation (19), |C| is the cardinality of the set C and n is the number of tokens in the frame. Equation (19) indicates that each additional context can add a normalized cost of at least $11\varepsilon/n$ bits per token. The right-hand-side expression of equation (19) grows linearly with the number of contexts (i.e., the size of the set C). Thus, reducing the number of contexts (i.e., a smaller set C) can reduce the overhead. However, it remains the case that for every context, 11 probabilities are encoded: the 11 corresponds to the number of tokens (12) minus one (1). Using selective mixing for entropy coding, as described below, the number of probabilities to be encoded for some contexts can be reduced. For example, given the coefficient token tree 700, instead of encoding 11 probabilities, less than 11 are coded thereby reducing the overhead bits associated with coding distributions in frame headers.

As mentioned above, reducing the number of contexts (i.e., a smaller set C) can reduce the overhead. However, analysis of the first term of equation (18), namely the entropy $H(Q_c)$, indicates that reducing the number of contexts is not desirable.

The entropy $H(Q_c)$ is a concave function. This in turns means that, and as given by inequality (20), taking the linear combination of two distributions M and M', the entropy of the linear combination of the two distributions M and M' (i.e., the left-hand-side of the inequality) is greater than or equal to the linear sum of the entropies of the individual distributions (i.e., the right-hand-side of the inequality). The inequality (20) becomes a strict inequality when the two distributions M and M' are different.

$$H(\lambda M + (1-\lambda)M') \geq \lambda H(M) + (1-\lambda)H(M') \quad (20)$$

Given the inequality (20), it can be concluded that, in order to minimize the first term of the equation (18), it is desirable to increase the number of distinct distributions, which in turn means increasing the number of distinct contexts. This is so because by increasing the number of contexts, the left-hand-side of the inequality (20) can be decomposed into the right-hand-side. The decomposition can improve the overall compression performance.

To summarize, in order to improve compression performance, analysis of the second term of equation (18) and equation (19) leads to the conclusion that it is preferable to reduce the number of contexts; on the other hand, analysis of the first term of equation (18) and inequality (20) leads to the conclusion that it is desirable to increase the number of contexts in order to improve compression performance. Using selective mixing for entropy coding, as described below, the number of contexts can be increased and the overhead associated with every additional context can be reduced or limited. For example, and referring to the coefficient token tree 700 of FIG. 7, adding a context does not result in adding 11 probability values.

The following observations can be made:
1) In coding a transform coefficient, when a context c is determined, the coding distribution $P_c$ associated with the context c is used to code token for the transform coefficient,
2) The multiplicative factor of 11 in equation (19) is equal to the size of the alphabet of coefficient tokens minus one (1),
3) If a context c is to be split into two distinct contexts $c_0$ and $c_1$, then the number of times that the context $c_0$ appears and the number of times that the context $c_1$ appears is equal to the number of times that the context c appears (i.e., $n_c = n_{c_0} + n_{c_1}$).
4) If a context c is to be split into two distinct contexts $c_0$ and $c_1$, then the corresponding actual distributions $Q_{c_0}$ and $Q_{c_1}$ should be sufficiently different, and
5) For a given context c, the number of times $n_{c,i}$ that the token i appears in the frame under the context c, for all i, should be sufficiently large to ensure sufficient accuracy in probability estimation.

Given two distributions $Q_{c_0}$ and $Q_{c_1}$ that differ only at some indices but are similar or are the same at other indices, implementations according to this disclosure can split a context c into, for example, two contexts $c_0$ and $c_1$, only for those token indices at which $Q_{c_0}$ and $Q_{c_1}$ are different. In other words, each new context introduced can cost less than $11\varepsilon/n_c$ bits/token. For example, if a context is good for 4 tokens, then the cost is $3\varepsilon/n_c$.

Figure 13:
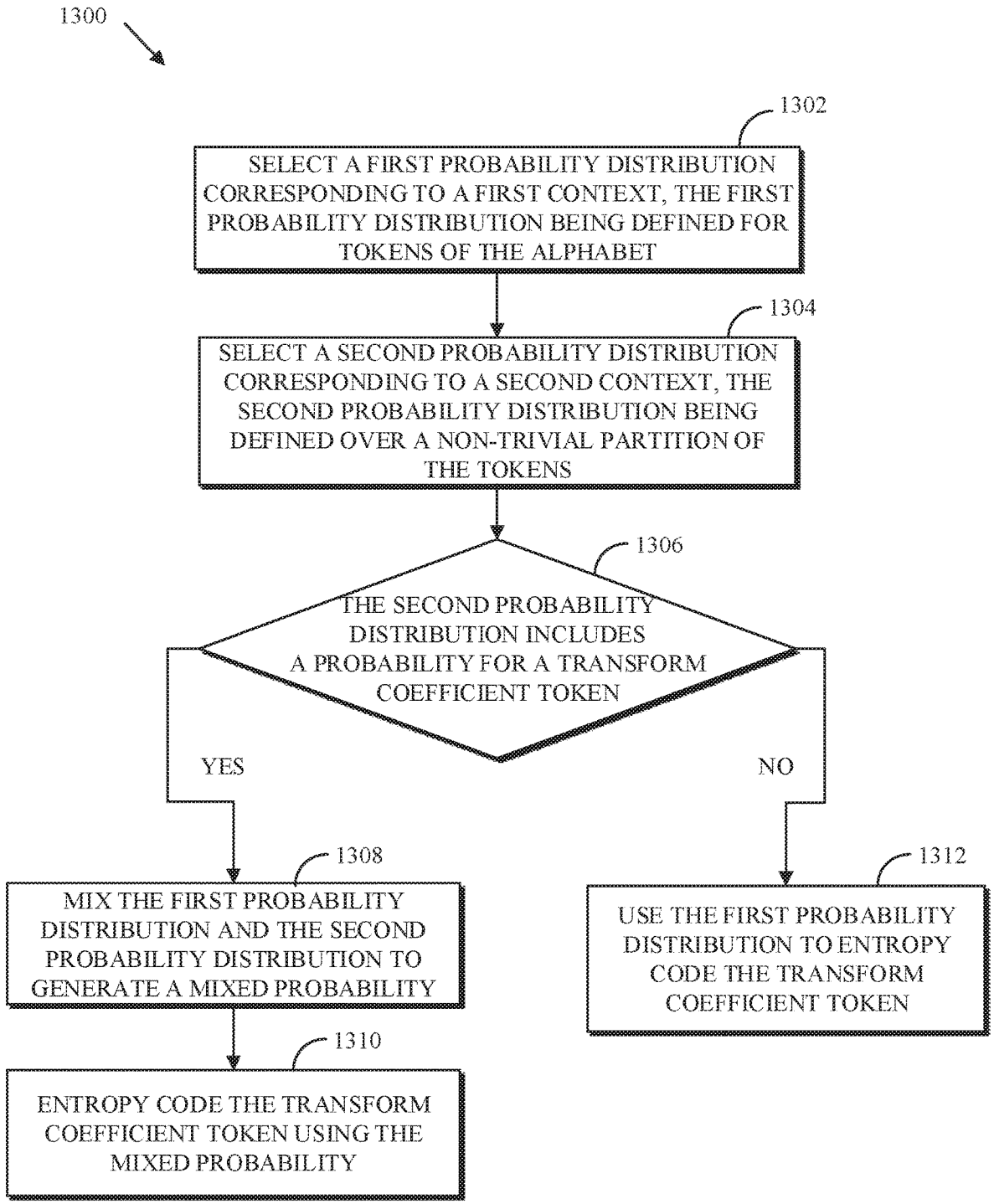
FIG. 13 is a flowchart diagram of a process for coding transform coefficients using an alphabet of transform coefficient tokens according to an implementation of this disclosure.

FIG. 13 is a flowchart diagram of a process 1300 for coding transform coefficients using an alphabet of transform coefficient tokens according to an implementation of this disclosure. The process 1300 codes (i.e., encodes or decodes) a current transform coefficient using two or more probability distributions. The process 1300 can code a token indicative of the current transform coefficient. The token can be determined or selected using a coefficient tree such as the coefficient token tree 700 of FIG. 7. As such, the alphabet includes the leaf nodes (i.e., the tokens) of the coefficient tree.

The process 1300 can be used by, or in conjunction with, a process that codes the coefficients of a transform block according to a scan order. The current transform coefficient can be at a scan position i in the scan order and can be at a coefficient location $(r_i, c_i)$ in the transform block.

The process 1300 selects a first probability distribution corresponding to a first context, selects a second probability distribution corresponding to a second context, and can mix, for some transform coefficient tokens, the first and second probability distributions to generate a mixing probability for coding a transform coefficient token of the some transform coefficient tokens.

The process 1300 can be implemented in an encoder such as the encoder 400 of FIG. 4. The process 1300 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 1300. In at least some implementations, the process 1300 can be performed in whole or in part by the entropy encoding stage 408 of the encoder 400 of FIG. 4.

The process 1300 can be implemented in a decoder such as the decoder 500 of FIG. 5. The process 1300 can be implemented, for example, as a software program that can be executed by computing devices such as receiving station 106. The software program can include machine-readable instructions that can be stored in a memory such as the memory 204 or the secondary storage 214, and that can be executed by a processor, such as CPU 202, to cause the computing device to perform the process 1300. In at least some implementations, the process 1300 can be performed in whole or in part by the entropy decoding stage 502 of the decoder 500 of FIG. 5.

When the process 1300 is implemented by an encoder, "coding" means encoding in an encoded bitstream, such as the compressed bitstream 420 of FIG. 4. When implemented by a decoder, "coding" means decoding from an encoded bitstream, such as the compressed bitstream 420 of FIG. 5.

At 1302, the process 1300 selects a first probability distribution. As used in this disclosure, "select" means to obtain, identify, construct, determine, specify or other select in any manner whatsoever.

In an example, the process 1300 can first derive a first context and select the first probability distribution that corresponds to the first context. For example, the context can be derived using one or more of the transform block size, the transform block shape (e.g., square or rectangular), the color component or plane type (i.e., luminance or chrominance), the scan position i of the current transform coefficient, and previously coded tokens. For example, in the case of the scan order 602 of FIG. 6, the previously coded coefficients can be the left neighboring coefficient and the top neighboring coefficient of the current transform coefficient. Other information can be used to derive the first context.

In an example, the first probability distribution can be defined over all the tokens of the alphabet. That is, the probability distribution includes a probability value for each of the tokens of the alphabet. Using the tokens of the coefficient token tree 700, let the alphabet set E denote the alphabet of coefficient tokens. As such the alphabet set E is given by E={EOB_TOKEN, ZERO_TOKEN, ONE_TOKEN, TWO_TOKEN, THREE_TOKEN, FOUR_TOKEN, DCT_VAL_CAT1, DCT_VAL_CAT2, DCT_VAL_CAT3, DCT_VAL_CAT4, DCT_VAL_CAT5, DCT_VAL_CAT6}. The first probability distribution can include a probability value for each of the tokens of the alphabet set E. In another example, the probability distribution can include probability values for some of the tokens of the alphabet. In an example, the first probability distribution can be a coding distribution as described above with respect to the coding distribution $P_c$.

At 1304, the process 1300 selects a second probability distribution. In an example, the process 1300 can derive a second context and select the second probability distribution that corresponds to the second context.

The second probability distribution can be defined over a partition of the tokens. Using the tokens of the coefficient token tree 700 of FIG. 7 as an illustrative example, the partition can correspond to a non-trivial partition $F_E$ of the alphabet set E. For example, the non-trivial partition $F_E$ can be $F_E$={{EOB_TOKEN}, {ZERO_TOKEN}, {ONE_TOKEN, TWO_TOKEN, THREE_TOKEN, FOUR_TOKEN, DCT_VAL_CAT1, DCT_VAL_CAT2, DCT_VAL_CAT3, DCT_VAL_CAT4, DCT_VAL_CAT5, DCT_VAL_CAT6}}. That is, the non-trivial partition $F_E$ partitions the alphabet set E into three non-overlapping subsets: {EOB_TOKEN}, {ZERO_TOKEN}, and the set that includes all other tokens. As such, the second probability distribution includes probability values for the elements of the partition.

In the example of the non-trivial partition $F_E$, the second probability distribution can include three (3) probability values. As the non-trivial partition $F_E$ includes only three (3) elements, the second context adds $2\varepsilon/n$ bits/token of overhead, which is significantly smaller than that of about $11\varepsilon/n$ bits/token added by a new context determining a probability distribution over the alphabet E (i.e., a context such as the first context).

As the second context targets a subset of the tokens of the alphabet E, the amount of overhead associated with an added second context is limited. An added second context results in much less overhead than an added first context.

In an example, the second context can be a context that targets the tokens of the alphabet set E that are used more frequently than other nodes. Targeting the more frequently used tokens can improve the coding (e.g., compression) performance for those tokens. For example, and referring again to the coefficient token tree 700 of FIG. 7, of the internal nodes (e.g., the nodes A-K), the root node 701 and the node 703 are the most frequently used nodes when coding transform coefficients. In traversing the tree to encode transform coefficients, the further down the tree an internal node is, the less frequently the node is traversed. That is, the further down the tree an internal node is, the smaller the number of times that the internal node is used in coding a transform coefficient becomes. As such, adding contexts (which is, as described above, desirable but for the overhead), can be limited to adding contexts for the most frequently used tokens.

In an example, the second context can be an actual distribution as described with respect to the actual distribution $Q_c$. In an example, the second context can be derived by leveraging the well-known fact that the probability of a token for the current coefficient (i.e., the coefficient at coefficient location ($r_i$, $c_i$) and corresponding to the scan position i) being zero (i.e., $t_i$=ZERO_TOKEN) is strongly correlated with the number of zeros in an immediate 2D (two-dimensional) neighborhood of the coefficient location ($r_i$, $c_i$). In an example, the second context can be derived using a neighborhood template that is anchored at the coefficient location ($r_i$, $c_i$). A neighborhood template can indicate, include, specify, or the like, the coefficient locations that constitute the neighborhood. The neighborhood template can be based on a scan order.

Figure 14:
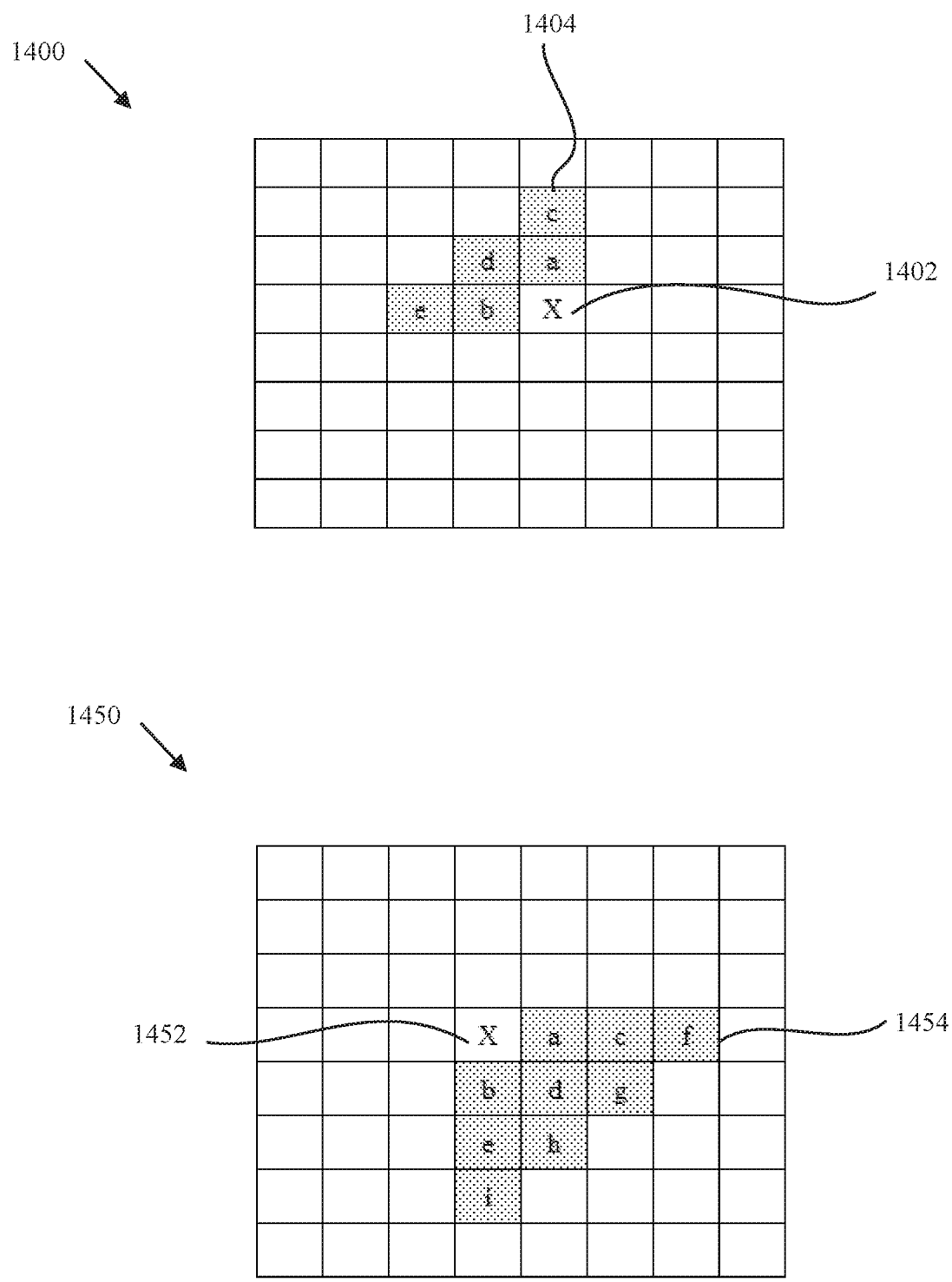
FIG. 14 is a diagram of neighborhood templates for deriving a context according to implementations of this disclosure.

FIG. 14 is a diagram of neighborhood templates 1400 and 1450 for deriving a context according to implementations of this disclosure. A neighborhood template includes the locations (i.e., neighboring locations) of coefficients that are coded before the current coefficient. As such, values for those coefficients are available for coding the current coefficient. The neighborhood template can include any number of locations. The neighborhood template can have any shape. For example, the neighborhood template need not include contiguous or adjacent locations.

The neighborhood template 1400 illustrates a neighborhood template that can be used with a forward scan order. A forward scan order is a scan order that proceeds from the top-left corner of the transform block to the bottom-right corner, such as the scan order 602 of FIG. 6. The neighborhood template 1400 illustrates a current coefficient 1402 and a neighborhood template 1404 that includes the locations of the five shaded coefficients marked a-e. A neighborhood template can include more or less coefficient locations. In an example, the values a-e can indicate whether the respective coefficients are zero or non-zero. As such, the values a-e can be binary values.

The neighborhood template 1450 illustrates a neighborhood template that can be used with a backward scan order. A backward scan order is a scan order that proceeds, for example, from the bottom-right corner of the transform block to the top-left corner. The neighborhood template 1450 illustrates a current coefficient 1452 and a neighborhood template 1454 that includes the locations of the nine shaded coefficients labeled a-i. However, as indicated above, a neighborhood template can include more or less coefficient locations.

In an example, the second context can be derived based on the number of zero coefficients in the neighborhood template. For example, and using the neighborhood template 1400, a context value can be selected from the set of context values {0, 1, 2, 3} based on the formula (a+b+c+d+e+1)>>1 where each of the values a-e is a zero (0) or a one (1) value and the ">>1" is a bit-shifts the sum (a+b+c+d+e+1) by one bit. In an example, a value of zero (0) can indicate that the coefficient at that location is a zero coefficient and a value of one (1) can indicate that the coefficient is non-zero. For example, if all of the neighborhood template coefficients are zero, then the context numbered 0 can be selected; if exactly one or exactly two of the neighborhood template coefficients are non-zero, then the context numbered 1 is selected; and so on. Other values and semantics are possible.

Referring again to FIG. 13, at 1306, in response to determining that the second probability distribution includes a probability for a transform coefficient token, the process 1300 proceeds to 1308. In an implementation, the process 1300 can include, if the second probability distribution does not include a probability for the transform coefficient token, then the process 1330 proceeds to 1312.

In an example, the second probability distribution includes a probability for a transform coefficient token when the transform coefficient token is included in a singleton element of the partition. For example, the non-trivial partition $F_E$ described above is determined to include a probability for the token EOB_TOKEN since the EOB_TOKEN is included is the singleton element {EOB_TOKEN} of the non-trivial partition $F_E$. As a reminder, a singleton element is a subset of the alphabet set E that includes only one element. As such, the second probability distribution is not determined to include a probability for, e.g., the FOUR_TOKEN because the FOUR_TOKEN is not included in a singleton element of the non-trivial partition $F_E$.

As indicated above, the first context can be used to obtain the first probability distribution that can be a probability distribution over the alphabet set E and the second context can be used to obtain a second probability distribution that is defined over the non-trivial partition $F_E$. Referring to the coefficient token tree 700, in an example, the first context can be used to determine a binary probability distribution for coding (i.e., encoding or decoding) binary decisions at every internal node, and the second context can be used to determine binary distributions at only two internal nodes: the root node 701 and its right child node (i.e., the node 703).

At 1308, the process 1300 mixes the first probability distribution and the second probability distribution to generate a mixed probability. At 1310, the process 1330 entropy codes the transform coefficient token using the mixed probability.

Given the non-trivial partition $F_E$, the coding distributions for the two internal nodes (i.e., the root node 701 and the node 703) may be obtained by mixing the distribution obtained from the first context (i.e., the first probability distribution) and the distribution obtained from the second context (i.e., the second probability distribution). As such, a probability distribution for coding a token need not be selected a priori; rather the mixing, as described above, can result in the best combination.

The mixing can be as described above with respect to FIGS. 9-12. In an example, the process 1300 can generate the mixed probability by determining, using the first probability distribution, a first conditional probability for decoding the transform coefficient token, determining, using the second probability distribution, a second conditional probability for encoding the transform coefficient token, and determining, using the first conditional probability and the second conditional probability, the mixed probability.

Using a token tree, such as the coefficient token tree 700 of FIG. 7, as an example, the first conditional probability distribution can be the conditional probability distribution at an internal node. The conditional probability distribution at an internal node is the probability distribution of selecting a child node (i.e., the left child or the right child) of the internal node given a first context determined from coded history (i.e., previously coded coefficients) and side information. Examples of side information include plane type (e.g., luminance, chrominance, etc.), transform size (i.e., transform block size), and transform type (e.g., DCT, ADST, etc.). Other side information can be available. The second conditional probability distribution is the conditional probability distribution at the same internal node given a second context determined from coded history and side information. The first context and the second context can be derived using different information in the coded history and different side information.

Using the non-trivial partition $F_E$ as an example, the first conditional probability distribution can be the conditional probability distribution over the non-trivial partition $F_E$ given a first context determined from coded history and side information; and the second conditional probability distribution can be the conditional probability distribution over $F_E$ given a second context determined from coded history and other or the same side information.

If a first context determines a probability distribution P, over the alphabet set E, a probability distribution Q in $F_E$ can be determined such that, for any element e in $F_E$, the probability of the element e, Q(e), can be given by the sum of the probabilities of all the tokens in the element e (e a set of tokens): $Q(e)=\Sigma_{t \in e} P(t)$. Since $F_E$ is a non-trivial partition of the alphabet set E, selective mixing of probability values is essentially carried out or performed for elements e in the alphabet set E.

At 1312, on condition that the second probability distribution not including a probability for the transform coefficient token, the process 1300 uses the first probability distribution to entropy code the current transform coefficient token. That is, for the remaining internal nodes (i.e., the nodes that are not included in singletons of the partition E), the coding distributions may be obtained from the first context. That is, the first probability distribution can be used to entropy code the remaining coefficients.

To summarize, selective mixing of the first probability distribution and the second probability distribution can be used for a subset of tokens used for coding transform coefficients. In an example, the tokens correspond to the internal nodes of a coefficient token tree. For example, selective mixing can be used only for internal nodes (i.e., often-used nodes) that are used more often than other internal nodes (i.e., not often-used nodes). In an example, the internal nodes that are used more often can be given as a listing of the tokens corresponding to those internal nodes. In another example, internal nodes that are used more often can be the singletons of the non-trivial partition $F_E$. If mixing is not used for an internal node, then the first probability distribution can be used as the coding distribution. As such, mixing is selectively applied to some nodes: the first and the second distributions are mixed for some internal nodes (e.g., an often-used node) and the first distribution is used for coding the other internal nodes (e.g., a not often-used node).

In the above example, the alphabet set E was partitioned into the non-trivial partition $F_E$. As such, the token of the alphabet set E are considered unrelated and distinct. That is, even though the tokens of the coefficient token tree 700 were used to illustrate the process 1300, the partition treats the tokens in unrelated and distinct tokens. That is, the partition E does not leverage the tree structure and can be used with any alphabet set.

In another example, a tree structure of tokens, if available, can be used to select the second probability distribution. The tree structure (such as the coefficient token tree 700) can relate, by virtue of its hierarchy, one token to another. As such, the second probability distribution can be a probability distribution that is defined at some internal nodes of the coefficient token tree.

In an example, the internal nodes that are used more often can be nodes that are closer to the root node than other internal nodes. For example, in the coefficient token tree 700, the node labeled C is closer to the root node 701 than the node labeled K because traversal from the root node requires less hops to reach the node labeled C than to reach the node labeled K.

In an example, selective mixing can be used for internal nodes that are within (or no more than) a predetermined number of hops from the root node. For example, if the predetermined number of hops is two (2), then selective mixing can be used for the internal nodes labeled A (i.e., the root node 701), the node 703, and the node labeled C. As such, whether an internal is "often used" can be determined based a proximity of the internal node to the root node. An internal node, corresponding to a token, is "used" when, for example, in the process of coding another token, a decision related to the token is also coded.

The probability of coding a token of the some internal nodes (i.e., a sequence $x^n$ generated by traversing the tree) can be determined as described with respect to FIG. 9 by mixing the first probability distribution and the second probability distribution. That is, for the internal nodes that have both distributions from the first probability distribution and the second probability distribution, a mixed probability can be obtained for entropy coding the current coefficient. For all other internal nodes, the first probability distribution is used to entropy code the current coefficient.

If k is the number of internal nodes that are affected by the second context, then the second context adds, approximately, $k\varepsilon/n$ bits/token, whereas the first context adds, for the tokens of the coefficient token tree 700, $11\varepsilon/n$ bits/token.

By using selective mixing, the set of available contexts C in coding system can be divided into a first set $C_0$ and a second set $C_1$. Using the alphabet E of coefficient tokens as an example, the first set $C_0$ can be derived from contextual information that affects the overall distribution over the alphabet E, and contexts in the set $C_1$ can be derived from contextual information that affects only a portion of the distribution over the alphabet E. Different contexts in the set $C_1$ can target different partitions of the alphabet E. Where a coefficient tree is available, different contexts in the set $C_1$ can target different internal nodes of the tree. For example, some contexts in the set $C_1$ can target the root node in the coefficient token tree. For example, some contexts in the set $C_1$ can target the internal node splitting ZERO_TOKEN from other tokens. For example, some contexts in the set $C_1$ can target the internal node splitting ONE_TOKEN from other tokens. Accordingly, instead of maintaining hundreds or thousands of contexts for all tokens of an alphabet in a coding system, a smaller subset can be maintained for all the tokens and another set of contexts can target tokens that may be deemed important, significant, or more frequently used.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding transform coefficients using an alphabet of transform coefficient tokens, the apparatus comprising:
    a memory; and
    a processor configured to execute instructions stored in the memory to:
        select, for entropy decoding a transform coefficient token, a first probability distribution corresponding to a first context, the first probability distribution being defined for all tokens of the alphabet, wherein the first context does not include the transform coefficient token;
        select, for entropy decoding the transform coefficient token, a second probability distribution corresponding to a second context, the second probability distribution being defined over a non-trivial partition of the tokens, wherein the non-trivial partition of the tokens partitions the alphabet into more than one non-overlapping subsets of the tokens, and wherein the second context does not include the transform coefficient token; and
        in response to determining that the second probability distribution includes a probability for the transform coefficient token by determining that the transform coefficient token is included in a singleton element of the non-trivial partition, executing instructions to:
            mix the first probability distribution and the second probability distribution to generate a mixed probability; and
            entropy decode, from an encoded bitstream, the transform coefficient token using the mixed probability.

2. The apparatus of claim 1, wherein the instructions further comprise instructions to:
    on condition that the second probability distribution not including a probability for the transform coefficient token, use the first probability distribution to entropy decode the transform coefficient token from the encoded bitstream.

3. The apparatus of claim 1, wherein the first probability distribution is a coding distribution.

4. The apparatus of claim 1, wherein the second probability distribution is an actual distribution.

5. The apparatus of claim 1, wherein to mix the first probability distribution and second probability distribution to entropy decode the transform coefficient token from the encoded bitstream comprises to:
    determine, using the first probability distribution, a first conditional probability for decoding the transform coefficient token, the first conditional probability being a conditional probability of the transform coefficient token given other transform coefficient tokens of the alphabet;
    determine, using the second probability distribution, a second conditional probability for encoding the transform coefficient token, the second conditional probability being a conditional probability of the singleton element of the non-trivial partition given other elements of the non-trivial partition; and
    determine, using the first conditional probability and the second conditional probability, the mixed probability for decoding the transform coefficient token.

6. The apparatus of claim 1, wherein a transform coefficient corresponding to the transform coefficient token is at a location of a transform block, and wherein the second context is determined using a number of zero coefficients at locations neighboring the location.

7. The apparatus of claim 6, wherein the locations neighboring the location are based on a scan order.

8. A method for coding transform coefficients using an alphabet of tokens, comprising:
    selecting, for entropy coding a token corresponding to a transform coefficient, a first probability distribution corresponding to a first context, the first probability distribution being defined for some tokens of the alphabet;
    selecting, for entropy coding the token, a second probability distribution corresponding to a second context, the second probability distribution being defined over a non-trivial partition of the tokens, wherein the non-trivial partition of the tokens partitions the alphabet into more than one non-overlapping subsets of the tokens; and
    in response to determining that the first probability distribution includes a probability for the token and the second probability distribution includes a second probability for the token,
        mixing the first probability distribution and the second probability distribution to generate a mixed probability, and
        coding the token using the mixed probability.

9. The method of claim 8, further comprising:
    on condition that the second probability distribution not including a probability for the token, using the first probability distribution to entropy code the token.

10. The method of claim 8, wherein the first probability distribution is a coding distribution.

11. The method of claim 8, wherein the second probability distribution is an actual distribution.

12. The method of claim 8, wherein determining that the second probability distribution includes a probability for the token comprises:
    determining that the token is included in a singleton element of the non-trivial partition.

13. The method of claim 12, wherein mixing the first probability distribution and second probability distribution to entropy code the token comprises:
    determining, using the first probability distribution, a first conditional probability for decoding the token, the first conditional probability being a conditional probability of the token given other tokens of the alphabet;
    determining, using the second probability distribution, a second conditional probability for encoding the token, the second conditional probability being a conditional probability of the singleton element of the non-trivial partition given other elements of the non-trivial partition; and determining, using the first conditional probability and the second conditional probability, the mixed probability for decoding the token.

14. The method of claim 8, wherein the transform coefficient is at a location, and wherein the second context is determined using a number of zero coefficients at neighboring locations.

15. The method of claim 14, wherein the neighboring locations are based on a scan order.

16. An apparatus for decoding transform coefficients using an alphabet of tokens organized in a coefficient token tree, the apparatus comprising:
   a memory; and
   a processor configured to execute instructions stored in the memory to:
      select a first probability distribution corresponding to a first context, the first probability distribution being defined for internal nodes of the coefficient token tree;
      select a second probability distribution corresponding to a second context, the second probability distribution being defined for some, but not all, internal nodes of the coefficient token tree;
      decode a first decision related to a first internal node of the coefficient token tree using a mixed probability, the mixed probability generated by mixing the first probability distribution and the second probability distribution; and
      decode a second decision related to a second internal node of the coefficient token tree using the first probability distribution, wherein the first internal node is used more often than the second internal node.

17. The apparatus of claim 16, wherein the first internal node is indicative of an end-of-block.

* * * * *